United States Patent
Bokma et al.

(10) Patent No.: US 10,095,345 B2
(45) Date of Patent: Oct. 9, 2018

(54) LOW POWER SCAN FOR DEVICE WAKE UP AND UNLOCK

(71) Applicant: Apple Inc., Cupertino, CA (US)

(72) Inventors: Louis W. Bokma, San Jose, CA (US); Sean Erik O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,736

(22) Filed: May 30, 2014

(65) Prior Publication Data

US 2015/0346895 A1 Dec. 3, 2015

(51) Int. Cl.
| | |
|---|---|
| *G06F 3/041* | (2006.01) |
| *G06F 3/0488* | (2013.01) |
| *G06F 1/32* | (2006.01) |
| *G06F 3/044* | (2006.01) |

(52) U.S. Cl.
CPC .......... *G06F 3/0416* (2013.01); *G06F 1/3262* (2013.01); *G06F 3/04883* (2013.01); *G06F 3/044* (2013.01); *G06F 2203/04808* (2013.01)

(58) Field of Classification Search
CPC .... G06F 1/3262; G06F 3/0412; G06F 3/0416; G06F 3/0484; G06F 3/04883
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,476,797 B1 * | 11/2002 | Kurihara | G06F 1/3203 345/173 |
| 6,690,387 B2 | 2/2004 | Zimmerman et al. | |

(Continued)

FOREIGN PATENT DOCUMENTS

| | | |
|---|---|---|
| JP | 2000-163031 S | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Latanya Bibbins
(74) *Attorney, Agent, or Firm* — Morrison & Foerster LLP

(57) ABSTRACT

A low power can for device wake up and unlock is disclosed. The low power scan can include one or more algorithms used to detect a sequence and/or one or more gestures to wake up a processor and unlock the device for user interaction. A sequence and/or one or more gestures can be determined by a microcontroller and/or by a separate hardware component. The microcontroller can send a notification or a wake signal to the processor and/or switch the device from an idle to an active state. By detecting a sequence and one or more gestures in the microcontroller before powering on or waking up the processor, the amount of power consumed can be reduced and the battery life extended.

29 Claims, 17 Drawing Sheets

(56) References Cited

U.S. PATENT DOCUMENTS

| | | | |
|---|---|---|---|
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,174,503 B2* | 5/2012 | Chin | G06F 3/04883 345/156 |
| 8,479,122 B2 | 7/2013 | Hotelling et al. | |
| 2006/0197753 A1 | 9/2006 | Hotelling | |
| 2007/0152966 A1* | 7/2007 | Krah | G06F 3/016 345/163 |
| 2008/0158185 A1* | 7/2008 | Westerman | G06F 3/0488 345/173 |
| 2010/0253639 A1* | 10/2010 | Huang | G06F 3/0412 345/173 |
| 2010/0289754 A1* | 11/2010 | Sleeman | G06F 3/0416 345/173 |
| 2011/0316797 A1* | 12/2011 | Johansson | 345/173 |
| 2012/0191993 A1 | 7/2012 | Drader et al. | |
| 2012/0249431 A1* | 10/2012 | Li | G06F 3/0483 345/173 |
| 2013/0002579 A1* | 1/2013 | Hatano | G06F 3/0418 345/173 |
| 2014/0015763 A1* | 1/2014 | Woolley | G06F 3/0416 345/173 |
| 2014/0055410 A1* | 2/2014 | Nakajima | G06F 1/3262 345/174 |
| 2014/0104225 A1* | 4/2014 | Davidson | G06F 3/044 345/174 |
| 2014/0267104 A1 | 9/2014 | Ahmed et al. | |
| 2014/0267133 A1 | 9/2014 | Steuer et al. | |
| 2015/0130742 A1* | 5/2015 | Chen | G06F 3/044 345/174 |
| 2015/0185924 A1 | 7/2015 | Chang | |
| 2015/0242053 A1 | 8/2015 | Gao et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

First Action Interview Office Action Summary dated Nov. 15, 2016, for U.S. Appl. No. 14/472,184, filed Aug. 28, 2014, five pages.

First Action Interview Pilot Program Pre-Interview Communication dated Aug. 24, 2016, for U.S. Appl. No. 14/472,184, filed Aug. 28, 2014, three pages.

Notice of Allowance dated Sep. 1, 2017, for U.S. Appl. No. 14/472,184, filed Aug. 28, 2014, eight pages.

Final Office Action dated Apr. 13, 2017, for U.S. Appl. No. 14/472,184, filed Aug. 28, 2014, 20 pages.

* cited by examiner

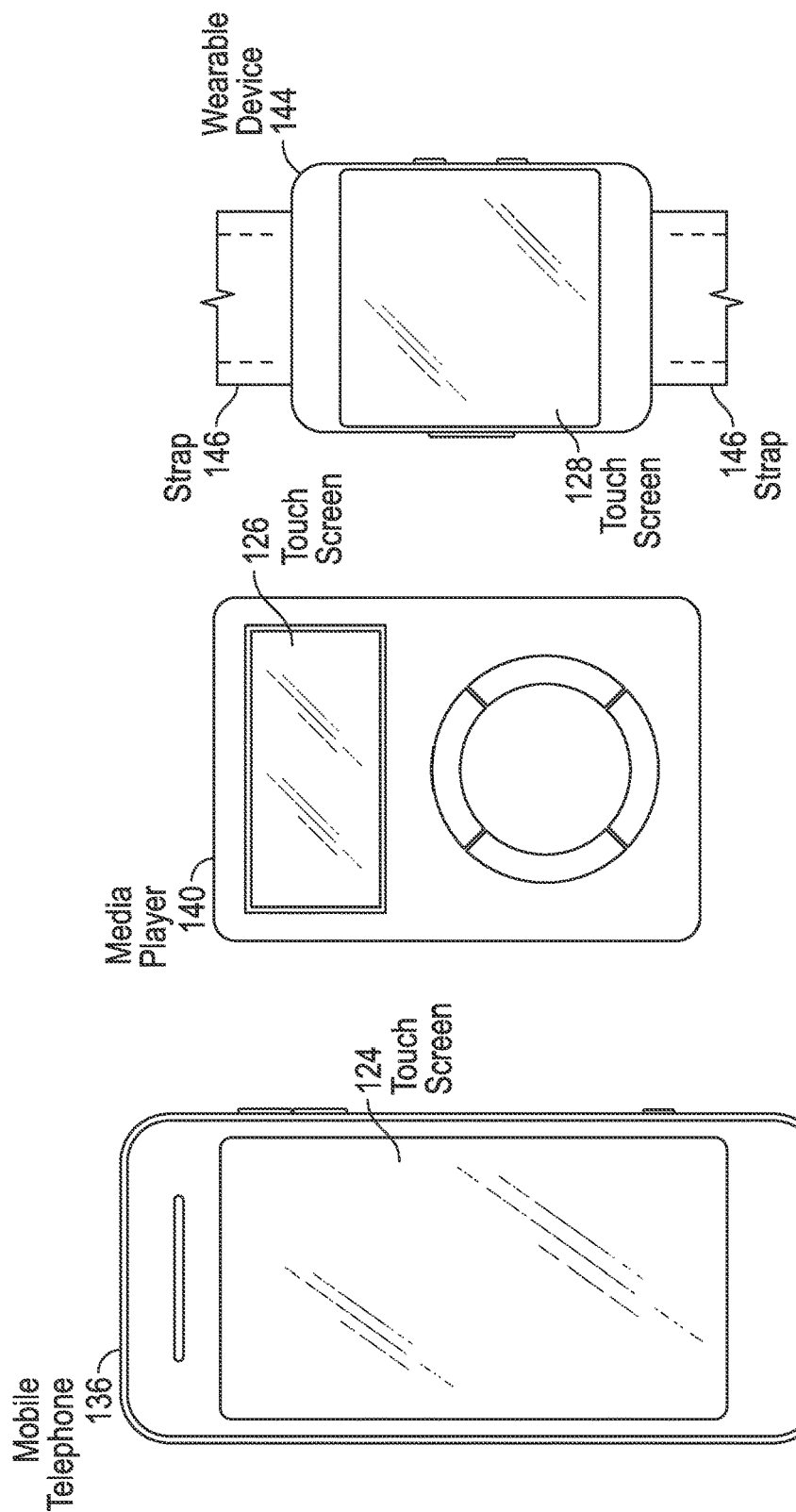

| Sensing Point | Value |
|---|---|
| D2,S2 | 25 |

| Sensing Point | Corrected Value |
|---|---|
| D2,S2 | 20 |

| Sensing Point | Value |
|---|---|
| D0,S0 | 5 |
| D0,S1 | 80 |
| D0,S2 | 80 |
| D0,S3 | 80 |
| D0,S4 | 5 |
| D1,S0 | 80 |
| D1,S1 | 80 |
| D1,S2 | 80 |
| D1,S3 | 80 |
| D1,S4 | 80 |
| D2,S0 | 80 |
| D2,S1 | 80 |
| D2,S2 | 80 |
| D2,S3 | 80 |
| D2,S4 | 80 |
| D3,S0 | 80 |
| D3,S1 | 80 |
| D3,S2 | 80 |
| D3,S3 | 80 |
| D3,S4 | 80 |
| D4,S0 | 5 |
| D4,S1 | 80 |
| D4,S2 | 80 |
| D4,S3 | 80 |
| D4,S4 | 5 |

FIG. 5B

| Sensing Point | Corrected Value |
|---|---|
| D0,S0 | 0 |
| D0,S1 | 75 |
| D0,S2 | 75 |
| D0,S3 | 75 |
| D0,S4 | 0 |
| D1,S0 | 75 |
| D1,S1 | 75 |
| D1,S2 | 75 |
| D1,S3 | 75 |
| D1,S4 | 75 |
| D2,S0 | 75 |
| D2,S1 | 75 |
| D2,S2 | 75 |
| D2,S3 | 75 |
| D2,S4 | 75 |
| D3,S0 | 75 |
| D3,S1 | 75 |
| D3,S2 | 75 |
| D3,S3 | 75 |
| D3,S4 | 75 |
| D4,S0 | 0 |
| D4,S1 | 75 |
| D4,S2 | 75 |
| D4,S3 | 75 |
| D4,S4 | 0 |

FIG. 5C

| Sensing Point | Corrected Value |
|---|---|
| D0,S0 | 0 |
| D0,S4 | 0 |
| D4,S0 | 0 |
| D4,S4 | 0 |
| D0,S1 | 75 |
| D0,S2 | 75 |
| D0,S3 | 75 |
| D1,S0 | 75 |
| D1,S1 | 75 |
| D1,S2 | 75 |
| D1,S3 | 75 |
| D1,S4 | 75 |
| D2,S0 | 75 |
| D2,S1 | 75 |
| D2,S2 | 75 |
| D2,S3 | 75 |
| D2,S4 | 75 |
| D3,S0 | 75 |
| D3,S1 | 75 |
| D3,S2 | 75 |
| D3,S3 | 75 |
| D3,S4 | 75 |
| D4,S1 | 75 |
| D4,S2 | 75 |
| D4,S3 | 75 |

FIG. 5D

| Sensing Point | Value |
|---|---|
| D0,S0 | 5 |
| D0,S1 | 5 |
| D0,S2 | 5 |
| D0,S3 | 5 |
| D0,S4 | 5 |
| D1,S0 | 5 |
| D1,S1 | 5 |
| D1,S2 | 75 |
| D1,S3 | 5 |
| D1,S4 | 5 |
| D2,S0 | 5 |
| D2,S1 | 75 |
| D2,S2 | 100 |
| D2,S3 | 75 |
| D2,S4 | 5 |
| D3,S0 | 5 |
| D3,S1 | 5 |
| D3,S2 | 75 |
| D3,S3 | 5 |
| D3,S4 | 5 |
| D4,S0 | 5 |
| D4,S1 | 5 |
| D4,S2 | 5 |
| D4,S3 | 5 |
| D4,S4 | 5 |

FIG. 6B

| Sensing Point | Corrected Value |
|---|---|
| D0,S0 | 0 |
| D0,S1 | 0 |
| D0,S2 | 0 |
| D0,S3 | 0 |
| D0,S4 | 0 |
| D1,S0 | 0 |
| D1,S1 | 0 |
| D1,S2 | 70 |
| D1,S3 | 0 |
| D1,S4 | 0 |
| D2,S0 | 0 |
| D2,S1 | 70 |
| D2,S2 | 95 |
| D2,S3 | 70 |
| D2,S4 | 0 |
| D3,S0 | 0 |
| D3,S1 | 0 |
| D3,S2 | 70 |
| D3,S3 | 0 |
| D3,S4 | 0 |
| D4,S0 | 0 |
| D4,S1 | 0 |
| D4,S2 | 0 |
| D4,S3 | 0 |
| D4,S4 | 0 |

FIG. 6C

| Sensing Point | Corrected Value |
|---|---|
| D1,S2 | 70 |
| D2,S1 | 70 |
| D2,S2 | 95 |
| D2,S3 | 70 |
| D3,S2 | 70 |

LOW POWER SCAN FOR DEVICE WAKE UP AND UNLOCK

FIELD OF THE DISCLOSURE

This relates generally to touch sensitive devices, and in particular, to a low power scan mode for waking up and unlocking touch sensitive devices.

BACKGROUND OF THE DISCLOSURE

Portable electronic devices, such as mobile telephones, media players and wearable devices can operate using a battery as a source of power. The battery can have a limited amount of power and lifetime before recharging. Therefore, portable electronic devices can have stringent power consumption requirements to make sure that they are able to power the device for an adequate amount of time, without requiring big and heavy batteries to do so. To conserve batter power, it may be beneficial to reduce the power consumption of applications and reduce computing complexity at certain times, and provide full functionality (and a resultant increase in power consumption) only when necessary.

SUMMARY

This relates to a low power scan for device wake up and unlock. The low power scan can include one or more algorithms used to detect a sequence and/or one or more gestures to wake up a processor and unlock the device for user interaction. A sequence and/or one or more gestures can be determined by a microcontroller and/or by a separate hardware component. The microcontroller can send a notification or a wake signal to the processor. The notification can wake the processor, and the processor can unlock the device and/or power on one or more components. By determining whether to unlock the device and/or switch the device from an idle state to an active state in the microcontroller before powering on or waking up the processor, the amount of power consumed can be reduced and the battery life extended.

BRIEF DESCRIPTION OF THE DRAWINGS

FIGS. 1A-1C illustrate systems in which examples of the disclosure can be implemented.

FIGS. 5A-5E illustrate an exemplary process for unlocking a device by rejecting a presence of an object covering the device surface using a low power scan according to examples of the disclosure.

FIGS. 6A-6E illustrate an exemplary process for unlocking a device by detecting a presence of a finger using a low power scan according to examples of the disclosure.

DETAILED DESCRIPTION

Figure 2A:
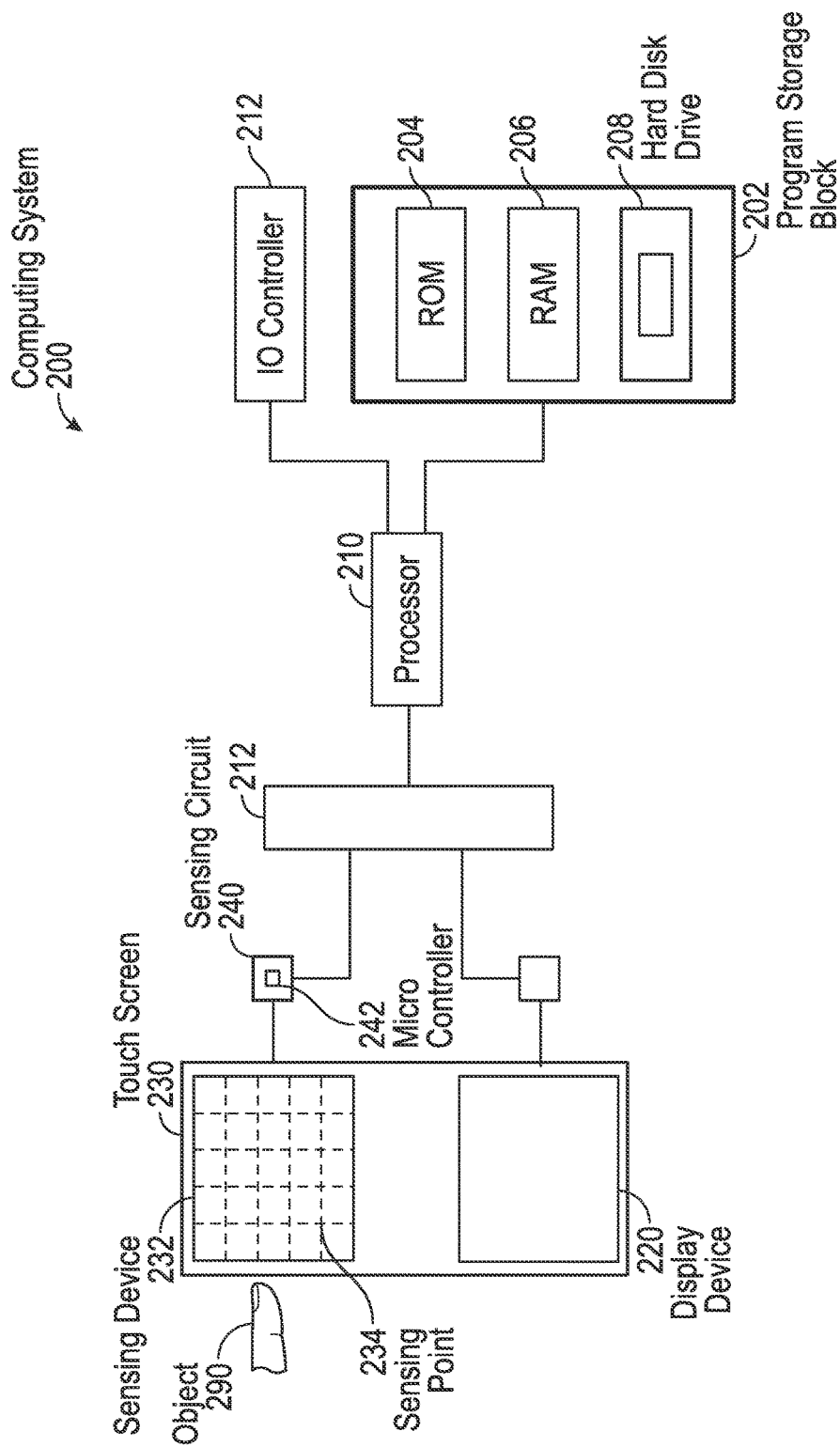
FIG. 2A illustrates an exemplary block diagram of a computing system for detecting or scanning a touch surface for a sequence or one or more gestures.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Touch-sensitive screens ("touch screens" or "touchscreens") can be used in many electronic devices to display graphics and text, and to provide a user interface through which a user may interact with the devices. A touch screen can detect and respond to contact on the touch screen. A device can display one or more soft keys, menus, and other user-interface objects on the touch screen. A user may interact with the device by contacting the touch screen at locations corresponding to the user-interface object with which the user wishes to interact.

Touch screens can be included in portable electronic devices, such as laptops, tablet computing devices, cellular telephones, media players, gaming devices, handheld devices, miniature devices, wearable devices, etc. In recent years, these electronics devices have become small, light, powerful, and more user-friendly. These electronic devices generally operate using some form of battery power. Batteries, however, can only provide a limited amount of power for a limited amount of time before being drained. Therefore, portable electronic devices can have stringent power requirements to make sure that they are able to power the device for an adequate amount of time, without requiring big and heavy batteries to do so.

To conserve battery power, the device can have several operating states. Each state can be associated with a level of availability of the computing device, and each state can have a related amount of power consumed. For example, the device can be in an active state with a relatively higher power consumption. Other states can include, but is not limited to, a sleep state and a standby state, with lower power consumption.

In an idle state (e.g., sleep state or standby state), some or all of the components (such as a processor) can be powered down, and the device can be idle. To unlock the device or to switch the device from an idle state to an active state, any number of unlocking procedures, such as pressing a sequence of on-screen buttons or performing one or more gestures (simultaneously or sequentially), can be used. The sequence and/or gestures can be detected by using a series of processing steps including using a watershed algorithm to determine the boundaries of one or more touch regions, calculating the centroid of each region, transferring the information to the processor, and then performing tap and event gesturing parsing. However, these series of processing steps can be complex and can involve a significant amount of processing power and hence, can consume a significant amount of battery life.

This disclosure relates to a low power scan for device wake up and unlock. The low power scan can include one or more algorithms used to detect a sequence and/or one or more gestures to wake up the processor and unlock the device for user interaction. A sequence and/or one or more gestures can be determined by a microcontroller and/or by a separate hardware component. The microcontroller can send a notification or a wake signal to the processor. The notification can wake the processor, and the processor can unlock the device and/or power on one or more components. By determining whether to unlock the device and/or switch the device from an idle state to an active state in the microcontroller before powering on or waking up the processor, the amount of power consumed can be reduced and the battery life extended.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. In other instances, well-known process steps have been described in detail in order to avoid unnecessarily obscuring the described examples. Other applications are possible, such that the following examples should not be taken as limiting.

FIGS. 1A-1C illustrate systems in which examples of the disclosure can be implemented. FIG. 1A illustrates an exemplary mobile telephone 136 that can include a touch screen 124. FIG. 1B illustrates an exemplary media player 140 that can include a touch screen 126. FIG. 1C illustrates an exemplary wearable device 144 that can include a touch screen 128 and can be attached to a user using a strap 146. The systems of FIGS. 1A-1C can utilize the one or more low power scan and detection mechanisms for device wake up and unlock as will be disclosed.

The one or more devices as illustrated in FIGS. 1A-1C can have several operating states that can range from fully on (e.g., active state) when a central processing unit (CPU) can be powered on and operational, to a CPU stop state where the CPU can be powered off but a software state can be saved in random access memory (RAM), to a very low power state (e.g., sleep state) where the software state can be saved in a non-volatile memory (such as a hard drive) and then the memory and CPU can be powered off, though the disclosure is not limited to just these states. Some operating states can consume relatively more power than others. Often times, to help conserve energy (and battery life for portable electronic devices), the portable electronic devices can switch to a lower powered state, such as standby state or a sleep state, when user interaction is reduced or temporarily absent. In some examples, a standby state can consume more power than a sleep state. In a sleep state, substantially all of the device components can be powered down. In a standby state, one or more components can be powered down while one or more components can be fully or partially on. For example, in a standby state, a touch panel and display can be powered down while a wireless transceiver can be fully on. The device can continue to receive messages or data through the Internet while the user is not interacting with the device.

When a device is in an active state and user interaction is reduced or temporarily absent, the device can include a timer. The timer can monitor or track the amount of time until a user interaction is received. If a certain amount of time has elapsed since a user interaction has been received, the device can automatically switch to an idle state. In some examples, the user can force the device to enter the idle state. When the user wishes to interact with the device and/or switch the device from an idle state to an active state, the user can "unlock" the device by pressing a sequence of one or more buttons or performing one or more gestures (simultaneously or sequentially).

Figure 2B:
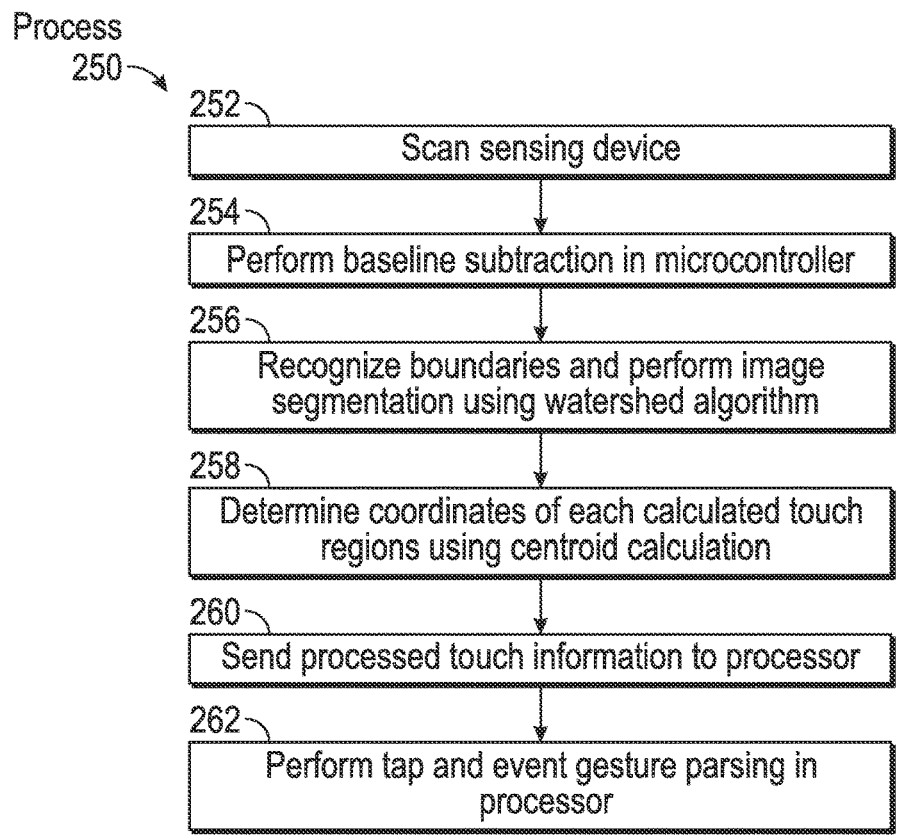
FIG. 2B illustrates an exemplary process for detecting or scanning a touch surface for a sequence or one or more gestures.

FIG. 2A illustrates an exemplary block diagram of a computing system and FIG. 2B illustrates an exemplary process for detecting or scanning a touch surface for a sequence or one or more gestures. Computing system 200 can correspond to any of the computing devices illustrated in FIGS. 1A-1C. Additionally, computing system 200 can also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Computing system 200 can include a processor 210 configured to execute instructions and to carry out operations associated with computing system 200. For example, using instructions retrieved from memory, processor 210 can control the reception and manipulation of input and output data between components of the computing system 200. Processor 210 can be a single-chip processor or can be implemented with multiple components.

In some examples, processor 210 together with an operating system can operate to execute computer code and produce and use data. The computer code and data can reside within a program storage block 202 that can be operatively coupled to the processor 210. Program storage block 202 can generally provide a place to hold data that is being used by the computing system 200. By way of example, the program storage block 202 can include Read-Only Memory (ROM)

204, Random-Access Memory (RAM) 206, hard disk drive 208 and/or the like. The computer code and data could also reside on a removable storage medium and loaded or installed onto the computing system 200 when needed. Removable storage mediums include, for example, CD-ROM, DVD-ROM, Universal Serial Bus (USB), Secure Digital (SD), Compact Flash (CF), Memory Stick, Multi-Media Card (MMC) and a network component.

Computing system 200 can also include an input/output (I/O) controller 212 that can be operatively coupled to processor 210 or it may be a separate component as shown. The I/O controller 212 can be configured to control interactions with one or more I/O devices. The I/O controller 212 can operate by exchanging data between the processor 210 and the I/O devices that desire to communicate with the processor 210. The I/O devices and the I/O controller 212 typically communicate through a data link. The data link may be a one way link or a two way link. In some cases, I/O devices can be connected to the I/O controller 212 through wireless connections. By way of example, a data link can correspond to PS/2, USB, Firewire, IR, RF, Bluetooth or the like.

Computing system 200 can include a display device 220 that can be operatively coupled to processor 210. Display device 220 can be a separate component (peripheral device) or may be integrated with the processor 210 and program storage block 202 to form a desktop computer (all in one machine), a laptop, handheld or tablet computing device or the like. Display device 220 can be configured to display a graphical user interface (GUI) including perhaps a pointer or cursor as well as other information to the user. By way of example, display device 220 can be any type of display including liquid crystal displays (LCDs), electroluminescent displays (ELDs), field emission displays (FEDs), light emitting diode displays (LEDs), organic light emitting diode displays (OLEDs) or the like.

Computing system 200 can also include a touch screen 230 that can be operatively coupled to processor 210. Touch screen 230 can be the combination of sensing device 232 and display device 220, where the sensing device 232 can be a transparent panel that is positioned in front of the display device 220 or integrated with the display device. In some cases, touch screen 230 can recognize touches and the position and magnitude of touches on its surface. Touch screen 230 can report the touches to processor 210, and the processor can interpret the touches in accordance with its programming. For example, processor 210 can perform tap and event gesture parsing and can initiate a wake of the device or powering on one or more components in accordance with a particular touch.

In some examples, the touch screen 230 can be capable of tracking multiple objects, which rest on, tap on, or move across the touch sensitive surface of the touch screen. The touch screen 230 can include a sensing device 232 configured to detect an object in close proximity thereto and/or the pressure exerted thereon. The sensing device 232 can be divided into several independent and spatially distinct sensing points, nodes or intersections 234 that are positioned throughout. Sensing points 234 can be dispersed about the touch screen 230 with each sensing point 234 representing a different position on the surface of the touch screen 230 (or touch screen plane). The sensing points 234 can be positioned in a grid or a pixel array where each pixilated sensing point 234 can be capable of generating a signal at a same time. In the simplest case, a signal can be produced each time an object is positioned over a sensing point 234. When an object is placed over multiple sensing points 234 or when the object is moved between or over multiple sensing points 234, multiple signals can be generated.

The number and configuration of the sensing points 234 can be widely varied. The number of sensing points 234 can depend on the desired sensitivity as well as the desired transparency of the touch screen 230. More nodes or sensing points 234 generally increases sensitivity, but reduces transparency (and vice versa). With regard to configuration, the sensing points 234 can map the touch screen plane into a coordinate system such as a Cartesian coordinate system, a Polar coordinate system or some other coordinate system. When a Cartesian coordinate system is used (as shown), the sensing points 234 can correspond to x and y coordinates. When a Polar coordinate system is used, the sensing points can correspond to radial (r) and angular coordinates (θ).

Touch screen 230 can be coupled to a touch controller or sensing circuit 240 that can acquire data from the touch screen and can supply the acquired data to the processor 210. In some cases, the sensing circuit 240 can be configured to send raw data to the processor 210 so that the processor 210 processes the raw data. For example, the processor 210 can receive data from the sensing circuit 240 and can determine how to interpret the data. The data can include the coordinates in each sensing point 234 as well as the pressure exerted on each sensing point 234. In some examples, sensing circuit 240 can be configured to process the raw data itself. That is, the sensing circuit 240 can read the signals from the sensing points 234 and turn them into data that the processor 210 can understand. Sensing circuit 240 can perform filtering and/or conversion processes. Filtering processes can be implemented to reduce a busy data stream to prevent the processor 210 from being overloaded with redundant or non-essential data. The conversion processes can be implemented to adjust the raw data before sending or reporting them to the processor 210. The conversion can include determining the center point for each touch region (e.g., centroid).

The sensing circuit 240 can include one or more microcontrollers, each of which monitors one or more sensing points 234. The microcontrollers can, for example, correspond to an application specific integrated circuit (ASIC), which works with firmware to monitor the signals from the sensing device 232 and to process the monitored signals and to report this information to the processor 210.

In some examples, sensing device 232 is based on capacitance. When two electrically conductive members come close to one another without actually touching, their electric fields can interact to form a capacitance. The first electrically conductive member can be a sensing point 234 and the second electrically conductive member can be an object 290 such as a finger. As the object 290 approaches the surface of the touch screen 230, a capacitance can form between the object 290 and the sensing points 234 in close proximity to object 290. By detecting changes in capacitance at each of the sensing points 234 and noting the position of the sensing points 234, the sensing circuit 240 can recognize multiple objects, and determine the location, pressure, direction, speed and acceleration of the objects 290 as they move across the touch screen 230. For example, the sensing circuit 240 can determine whether the sensed touch is a finger, tap, or an object covering the surface.

The sensing device 232 can be based on self-capacitance or mutual capacitance. In self-capacitance, each of the sensing points 234 can be provided by an individual charged electrode. As an object approaches the surface of the touch screen 230, the object capacitively couples to those electrodes in close proximity to the object, thereby stealing charge away from the electrodes. The amount of charge in each of the electrodes can be measured by the sensing circuit 240 to determine the positions of multiple objects when they touch the touch screen 230. In mutual capacitance, the sensing device 232 can include a two layer grid of spatially separated lines or wires, although other configurations are possible. The upper layer can include lines in rows while the lower layer can include lines in columns (e.g., orthogonal). The sensing points 234 can be provided at the intersections of the rows and columns. During operation, the rows can be charged, and the charge can be capacitively coupled from the rows to the columns. As an object approaches the surface of the touch screen 230, the object capacitively couples to the rows in close proximity to the object, thereby reducing the charge coupling between the rows and columns. The amount of charge in each of the columns can be measured by the sensing circuit 240 to determine the position of multiple objects when they touch the touch screen 230.

FIG. 2B illustrates an exemplary process for unlocking a device by detecting a sequence or one or more gestures. Process 250 can include scanning sensing device 232 in step 252. Object 290 can touch the touch surface, and sensing device 232 can form a touch "image." The microcontroller 242 in the sensing circuit 240 can receive the signals or capacitance values from the sensing device 232, and can perform a baseline subtraction on the signals in step 254. In step 256, the microcontroller can determine the boundaries of the touch image using a watershed algorithm. Generally speaking, the watershed algorithm can perform image segmentation, which can partition the image into distinct regions as, for example, the regions of multiple objects come in contact with the touch screen. In some examples, step 256 can include image filtering and/or smoothing.

In step 258, the microcontroller can determine the coordinates for each of the calculated touch regions using a centroid calculation with the raw data associated with each touch region. The centroid can include the central coordinate of the touch region. In some examples, the microcontroller can computer features associated with each touch region, such as second and higher moments, area, density, major and minor axes and orientation for a best fit ellipse, wavelet and other types of region shape and density features. In step 260, the microcontroller (located in the sensing circuit 240) can send the processed information to the processor 210. The processor 210 can then perform tap and event gesture parsing in step 262. Based on the results from the tap and event gesture parsing, processor 210 can determine if the touch matches the unlock sequence or gesture.

While the process exemplified in FIG. 2B can be used to detect a sequence and/or one or more gestures for unlocking a device, the calculations performed in steps 256 and 258 can consume a significant amount of processing power. Additionally, transmitting the calculated touch information from the microcontroller to the processor 210 can consume additional power and can require the processor to wake (thereby requiring more power) before determining whether or not to unlock the device. A detection mechanism that is simpler, faster, and consumes less power can be desired.

Figure 3:
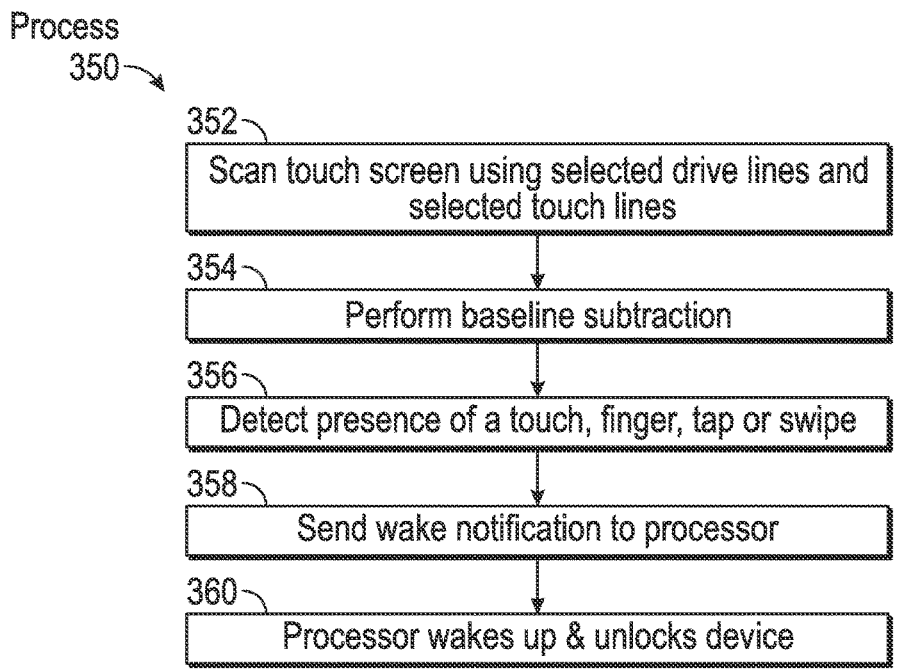
FIG. 3 illustrates an exemplary process for unlocking a device according to examples of the disclosure.

FIG. 3 illustrates an exemplary process for unlocking a device according to examples of the disclosure. Process 350 can include scanning the touch screen using selected drive lines and selected touch lines (step 352). To conserve power, one or more drive lines and/or one or more sense lines can be activated while the other drive and sense lines can be powered down. In some examples, multiple drive lines and/or multiple sense lines can be switched to the same circuitry to reduce power consumption. In some examples, drive and sense lines can be activated in some areas of the screen and deactivated in other areas. For example, drive and sense lines whose intersection occurs in the center of the screen can be activated, while other drive and sense lines can be deactivated. In some examples, all of the drive and sense lines can be activated, and the low power scan can include a full scan of the touch screen.

In step 354, a baseline subtraction can be performed by the microcontroller. In step 356, the microcontroller can detect the presence of a touch, finger, tap, or swipe using any one of the examples described below. In some examples, step 356 can be performed by a separate hardware component. In some examples, step 356 can be performed in firmware. In step 358, the microcontroller can send a notification or a wake signal to the processor 210. The notification can wake the processor 210, and the processor 210 can unlock the device and/or power on one or more components in step 360. By determining whether to unlock the device and/or switch the device from an idle state to an active state before powering on or waking up the processor, the amount of power consumed can be reduced and the battery life extended.

Figures 4A, 4B, 4C:
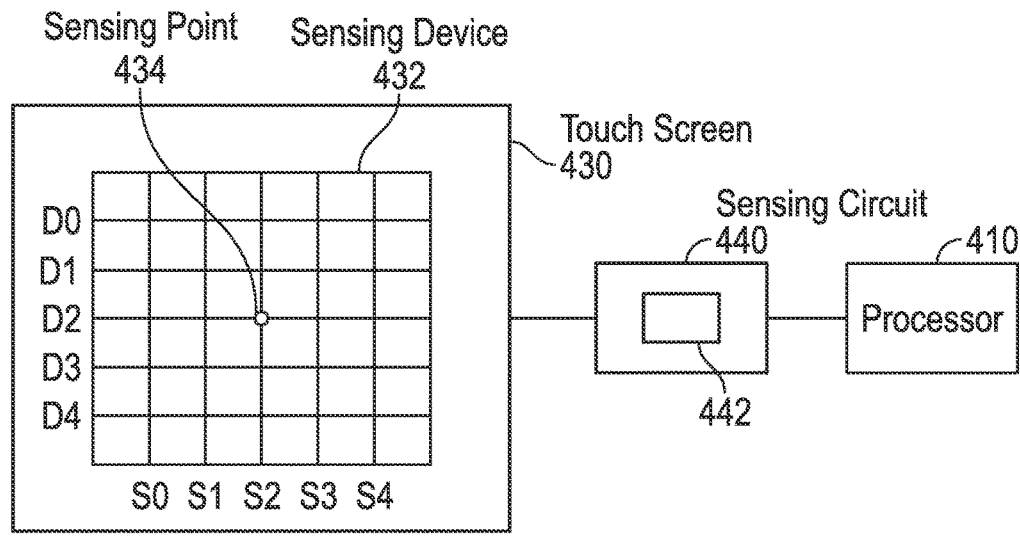
FIGS. 4A-4D illustrate an exemplary process for unlocking a device by detecting a presence of a touch using a low power scan according to examples of the disclosure.
Figure 4D:
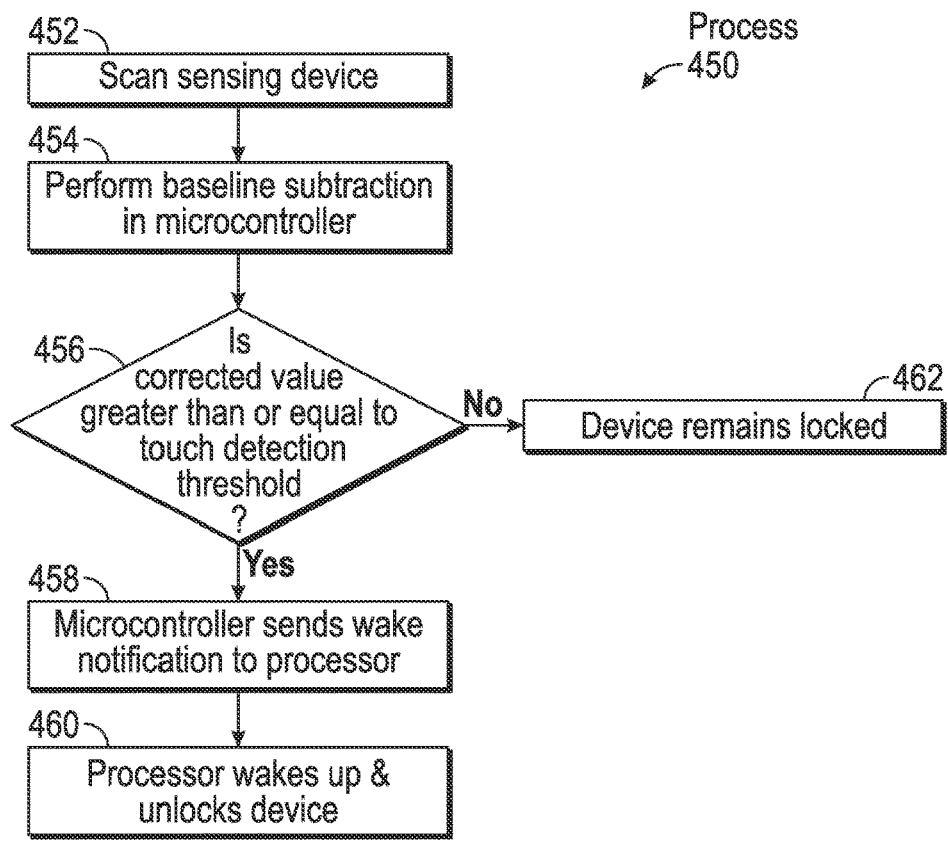

FIGS. 4A-4D illustrate an exemplary process for unlocking a device by detecting a presence of a touch using a low power scan according to examples of the disclosure. Process 450 can include scanning the sensing device 432 of touch screen 430 in step 452. As illustrated in FIG. 4A, sensing device 432 can include a plurality of drive lines D0-D4 and a plurality of sense lines S0-S4 whose intersections can form sensing points such as sensing point 434. Touch screen 430 can be operatively coupled to a sensing circuit 440. Sensing circuit 440 can include a microcontroller 442 and can be operatively coupled to a processor 410. In some examples, the scan can be limited to a certain area. For example, scanning the sensing device 432 can be limited to activating only those drive lines and sense lines whose sensing points 434 are located in the center of the sensing device 432. Although sensing device 432 is illustrated in FIG. 4A as a mutual capacitive touch sensing device, examples of the disclosure can include a self-capacitive touch sensing device.

Values at the sensing points 434 can be determined. As shown in FIG. 4B, a user touching the surface of touch screen 430 can be sensed by sensing point 434 located at the intersection of drive line D2 and sense line S2 and can generate a value of 25, for example. In step 454, the microcontroller 442 can perform a baseline subtraction (or division) on the generated value using a predetermined baseline value. For example, the predetermined baseline value can be 5, resulting in a corrected value of 20, as shown in FIG. 4C. In some examples, the predetermined baseline value can be indicative of a noise level in the absence of a touch. In step 456, the corrected value can be compared to a touch detection threshold. If the corrected value is greater than or equal to the touch detection threshold, microcontroller 442 can send a wake notification to processor 410 in step 458. In step 460, processor 410 can wake up in response to the received notification and can unlock the device. Otherwise, the device can remain locked (step 462).

Figure 5A:
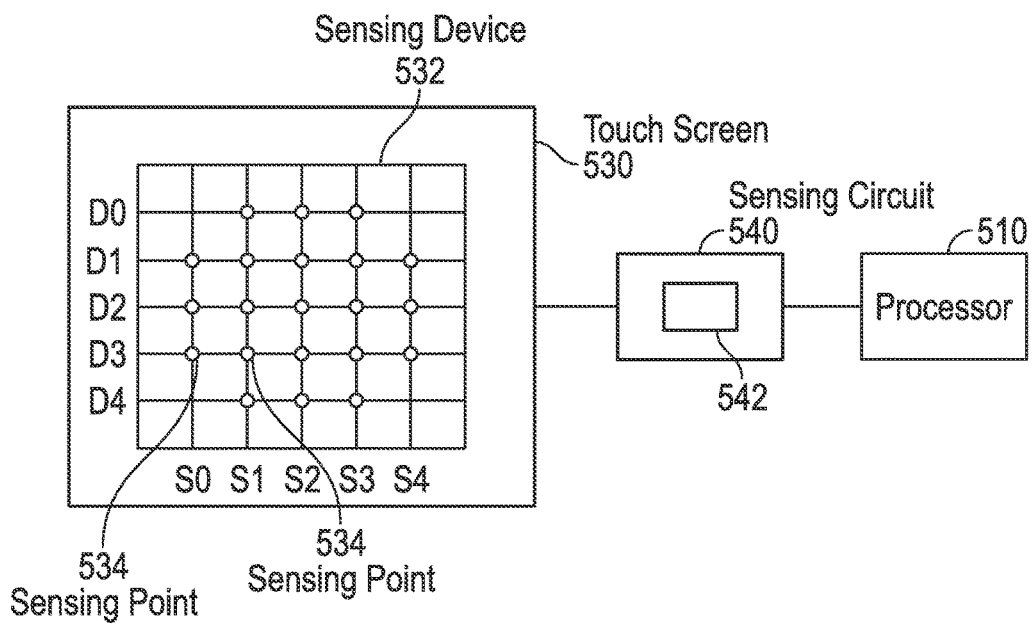
Figure 5E:
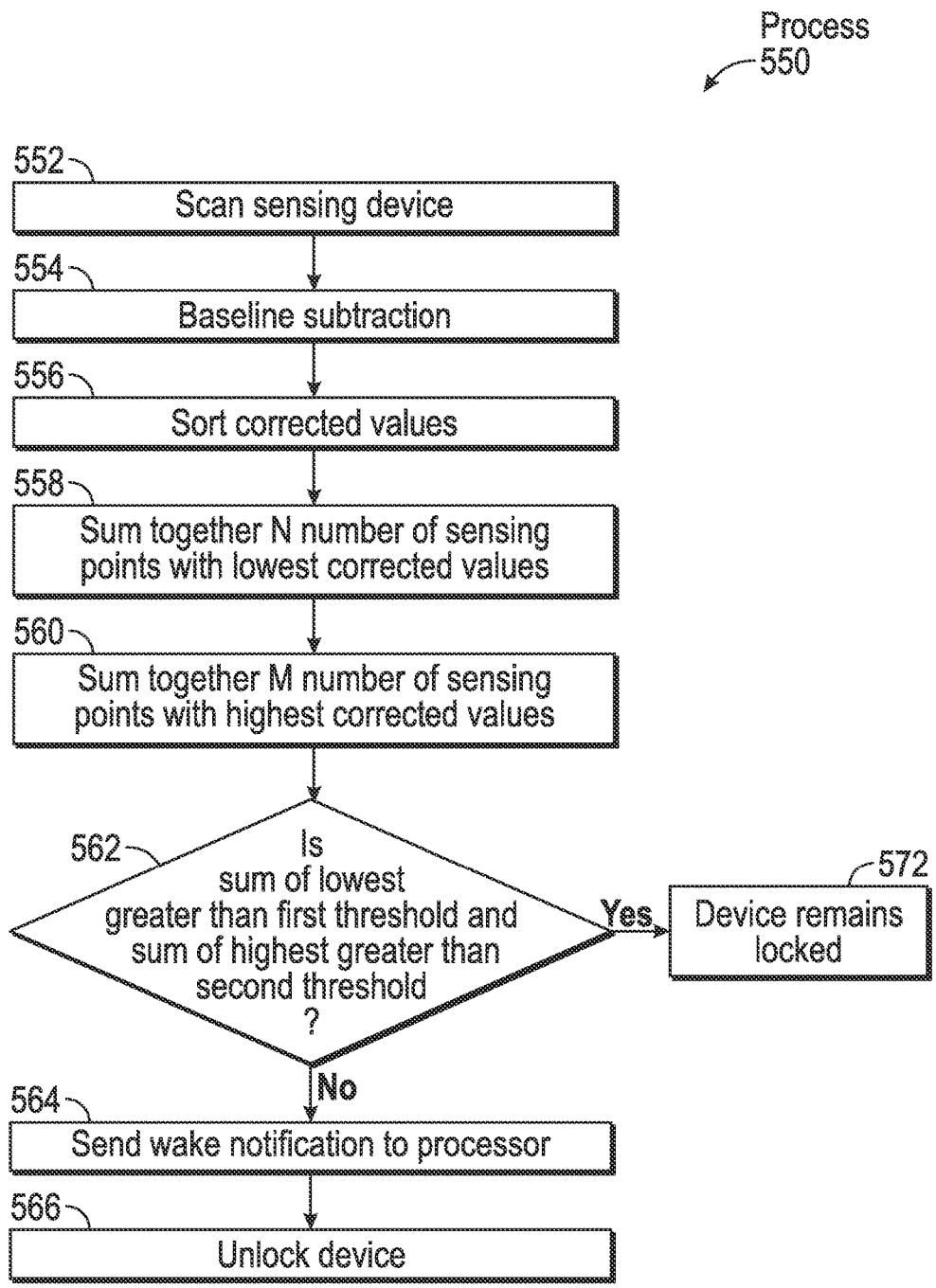

FIGS. 5A-5E illustrate an exemplary process for unlocking a device by rejecting a presence of an object covering the device surface using a low power scan according to examples of the disclosure. As illustrated in FIG. 5E, process 550 can include scanning the sensing device 532 of touch screen 530 in step 552. As illustrated in FIG. 5A, sensing device 532 can include a plurality of drive lines D0-D4 and a plurality of sense lines S0-S4 whose intersections can form sensing points such as sensing points 534. Touch screen 530 can be operatively coupled to sensing circuit 540, and sensing circuit 540 can include a microcontroller 542. Sensing circuit can be operatively coupled to a processor 510. Although sensing device 532 is illustrated in FIG. 5A as a mutual capacitive touch sensing device, examples of the disclosure can include a self-capacitive touch sensing device.

An object (e.g., a large body contact) can be covering the surface of the touch screen 530, and can lead to a plurality of sensing points 534 detecting the presence of the object. As shown in FIGS. 5A-5B, the presence of the object covering the surface of the touch screen 530 can cause a change in capacitance (as described earlier). The change in capacitance can be sensed at those sensing points 534 located at the intersection of drive lines D0-D4 and sense lines S0-S4. In step 554, microcontroller 542 can perform a baseline subtraction (or division) on the touch values using a predetermined baseline value or noise threshold. For example, the predetermined baseline value can be 5, and performing a baseline subtraction can lead to the corrected values shown in FIG. 5C. In step 556, the corrected values can be sorted in ascending (or descending) order, as shown in FIG. 5D.

In step 558, microcontroller 542 can sum together a certain number (e.g., N number) of sensing points with the lowest corrected values (compared to all or a subset of all of the corrected values). In step 560, microcontroller 542 can sum together a certain number (e.g., M number) of sensing points with the highest corrected values (compared to all or a subset of all of the corrected values). For example, N can be 6 and M can be 4. The sum of the N sensing points with the lowest corrected values can be 150 (e.g., sum of the lowest), and the sum of the M sensing points with the highest corrected values can be 300 (e.g., sum of the highest). In step 562, microcontroller 542 can compare the sum of the lowest to a first threshold value and can compare the sum of the highest to a second threshold value. If sum of the lowest is greater than the first threshold value and sum of the highest is greater than the second threshold value, then the touch detected is a large body contact or an object covering the surface of the device. As a result, the device can remain locked in step 572. If the touch detected is not a large body contact or an object covering the surface of the device, the microcontroller 542 can send a wake notification to processor 510 (step 564), and processor 510 can unlock the device (step 566). In some examples, the microcontroller 542 can check for other conditions before sending the wake notification to processor 510.

Figure 6A:
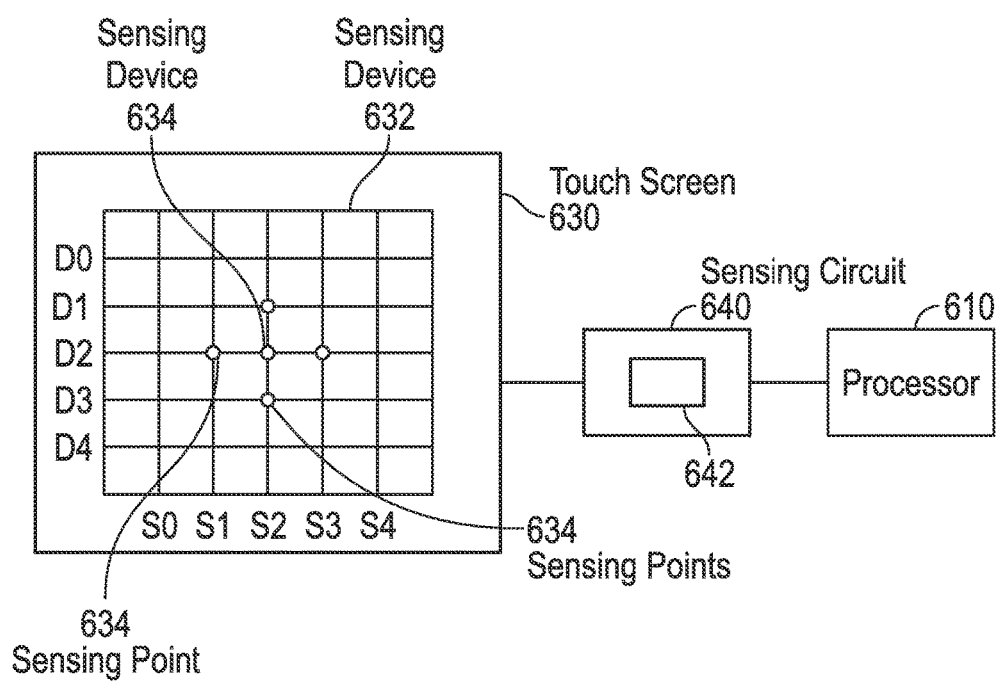

FIGS. 6A-6E illustrate an exemplary process for unlocking a device by detecting a presence of a finger using a low power scan according to examples of the disclosure. FIG. 6A illustrates a touch screen 630 including sensing device 632 and coupled to a sensing circuit 640. Sensing circuit 640 can include a microcontroller 642 and can be coupled to a processor 610. Sensing device 632 can include a plurality of drive lines D0-D4 and a plurality of sense lines S0-S4. The intersections of the drive lines and sense lines can form a plurality of sensing points 634. Process 650 can include scanning the sensing device 632 of touch screen 630 in step 652.

Figures 6D, 6E:
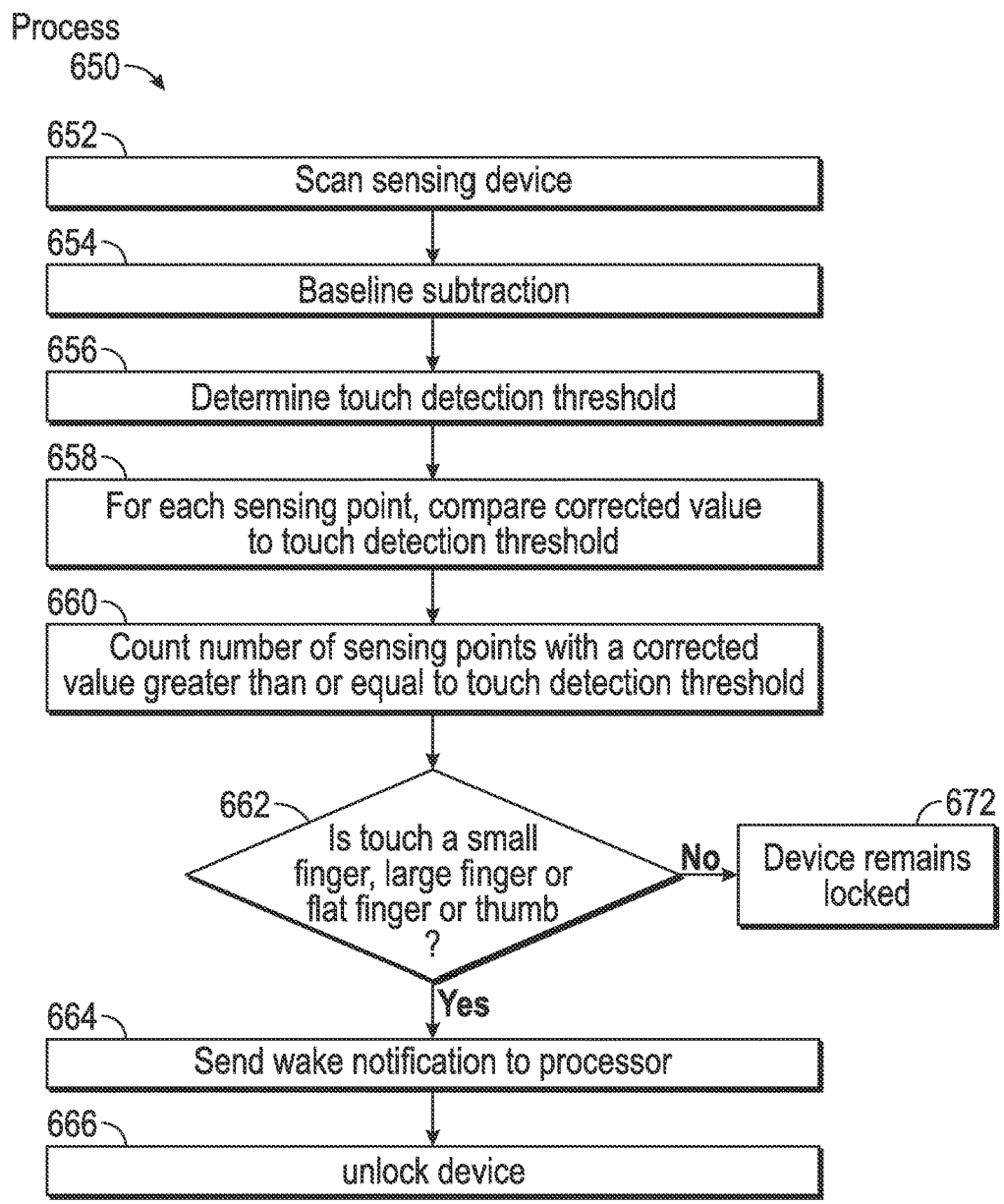

As shown in FIG. 6E, process 650 can include scanning the scanning device 632 of touch screen 630 in step 652. A finger can be present at the surface of the touch screen 630 leading to a change in values at the corresponding sensing points 634 (e.g., sensing points at (D1,S2), (D2,S1), (D2, S2), (D2,S3), and (D3,S2) intersections) as shown in FIG. 6B. In step 654, microcontroller 642 can perform a baseline subtraction on the values using a predetermined baseline value. For example, a predetermined baseline value of 5 can be subtracted from the values resulting in the corrected values shown in FIG. 6C.

The microcontroller 642 can determine if the touch is a finger (or another object) by looking at the area of the touch image. In step 656, microcontroller 642 can determine a touch detection threshold. The touch detection threshold can be, for example, a value calculated from a certain percentage of full coverage (e.g., the value when the touch screen surface is fully covered). In some examples, full coverage can have a value of 1024, and the touch detection threshold can be equal to 20% full coverage or 204. In some examples, the touch detection threshold can be predetermined. For example, the touch detection threshold can have a predetermined value of 50. In step 658, for each sensing point, microcontroller 642 can compare the corrected value to the touch detection threshold. Microcontroller 642 can discard any corrected values that are less than the touch detection threshold, as shown in FIG. 6D. The microcontroller 642 can count the number of sensing points with a corrected value greater than or equal to the touch detection threshold (e.g. number of peak pixels) in step 660. For example, the number of peak pixels can be 5. In step 662, microcontroller 642 can determine if the finger is a small finger (e.g., number of peak pixels is between 1 and 5), large finger (e.g., number of peak pixels is between 5 and 10) or a flat finger or thumb (e.g., number of peak pixels is greater than 10 but not a large body contact). If the number of peak pixels corresponds to a small finger, large finger, or flat finger or thumb, then microcontroller 642 can send a wake notification to processor 610 (step 664). In step 666, processor 610 can unlock the device. If the number of peak pixels does not correspond to a small finger, large finger, or flat finger or thumb, then the device can remain locked in step 672.

Figure 6F:
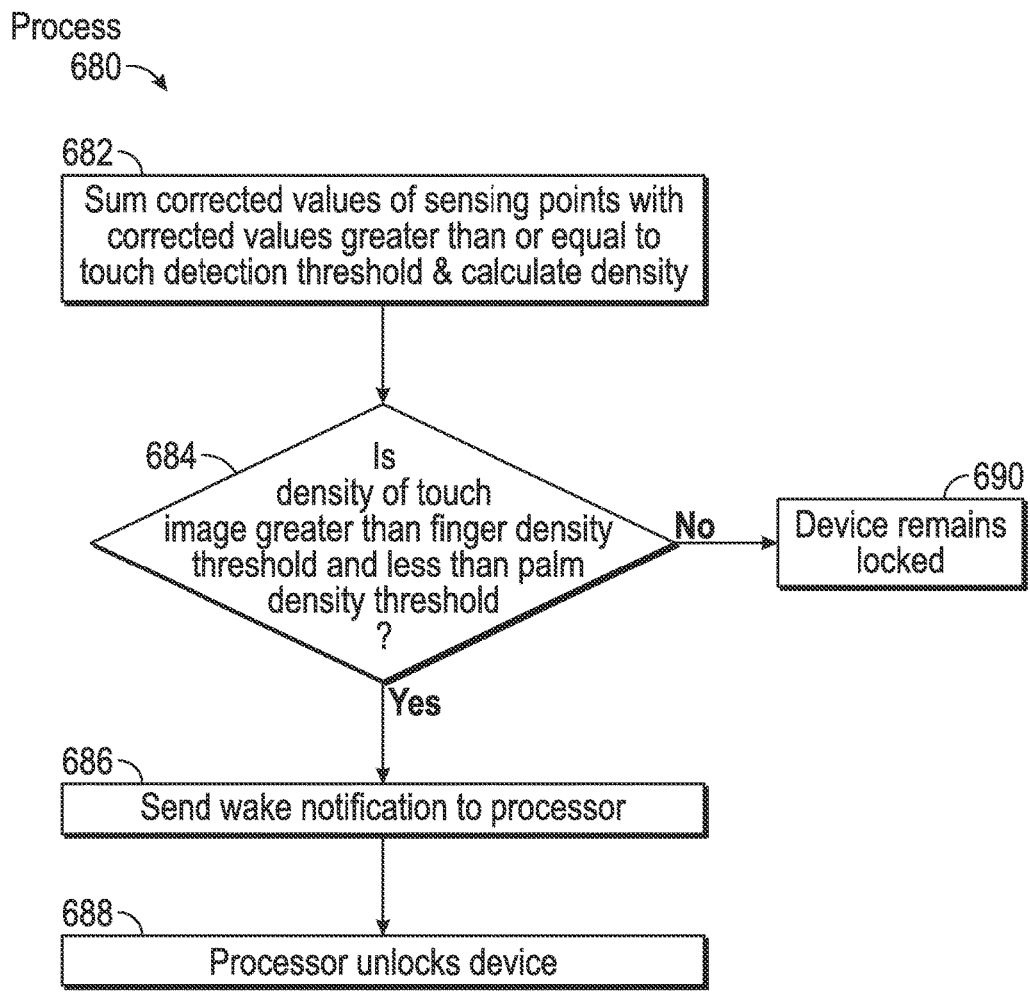
FIG. 6F illustrates an exemplary process for detecting a presence of a finger based on area and density using a low power scan according to examples of the disclosure.

In some examples, both an area and density can be used as an indication of a presence of a finger. FIG. 6F illustrates an exemplary process for detecting a presence of a finger based on area and density according to examples of the disclosure. Similar to process 650 in FIG. 6E, process 680 for detecting a presence of a finger based on area and density can include steps 652-662 for comparing the area of the touch image to an area of a finger. Process 680 can also include summing the corrected values of those sensing points 634 that have a corrected value greater than or equal to a touch detection threshold and calculating a density in step 682. For example, the sum of the corrected values of the sensing points can be 375 and the density can be 75. In step 684, microcontroller 642 can compare the density to a finger density threshold and a palm density threshold. If the density of the touch image is greater than the finger density threshold, but less than the palm density threshold, then the microcontroller 642 can send a wake notification to processor 610 (step 686), and processor 610 can unlock the device (step 688). If the density of the touch image is less than the finger density threshold or the density of the touch image is greater than the palm density threshold, the device can remain locked (step 690). The finger density threshold can be a value representative of a finger touch, and palm density threshold can be a value representative of a palm touch.

Figure 7:
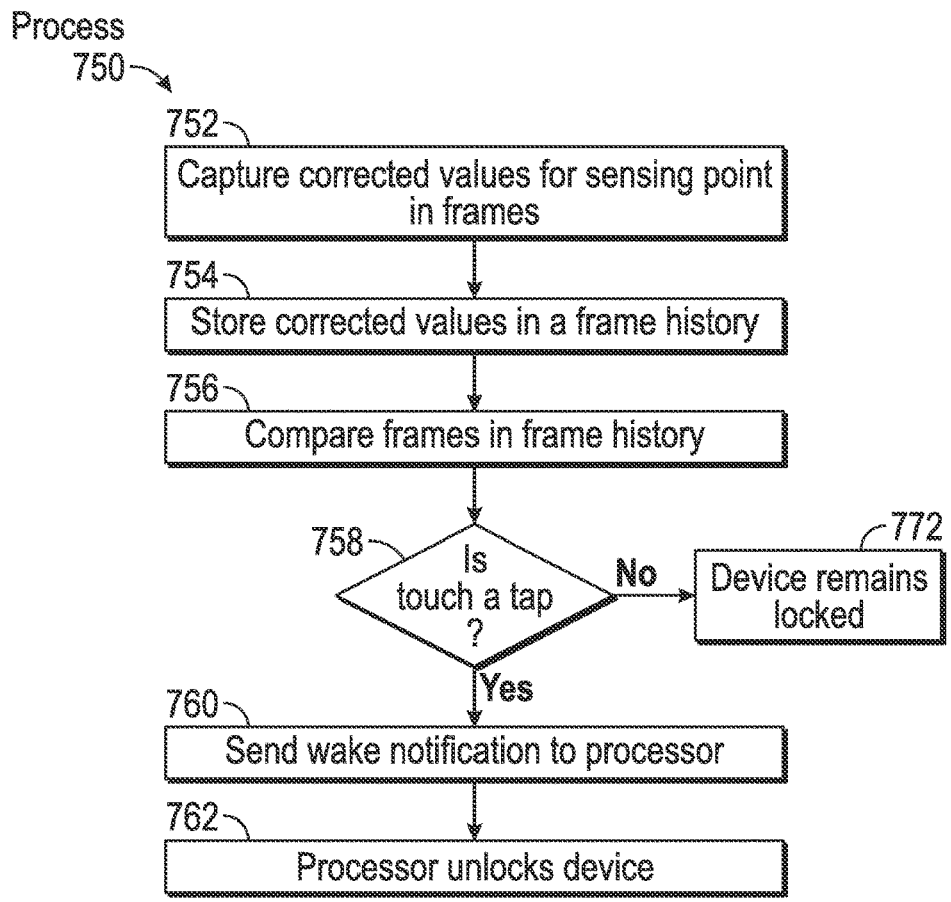
FIG. 7 illustrates an exemplary process for unlocking a device by detecting a presence of a tap using a low power scan according to examples of the disclosure.

FIG. 7 illustrates an exemplary process for unlocking a device by detecting a presence of a tap using a low power scan according to examples of the disclosure. Detecting a presence of a tap can include the microcontroller rejecting any touches that are large body contacts (as illustrated in FIGS. 5A-5E) and determining if the touch is a finger (as illustrated in FIGS. 6A-6F). Process 750 for detecting a tap can further include capturing corrected values for the plurality of sensing points in frames (step 752) and storing the result of each frame in a local memory or frame history (step 754). In step 756, the microcontroller can compare the results from a frame history. Based on the results from the frame history, the microcontroller can determine if the touch is a tap (step 758). In some examples, determining the touch is a tap can include a finger touch detected in one frame and no finger touch detected in a following frame. In some examples, the touch can be rejected as a tap if the duration of the touch exceeds a predetermined number of frames or a predetermined duration. In some examples, the touch can be rejected as a tap if its centroid position is not substantially near a center of the touch screen as determined by exceeding a predetermined distance threshold. The microcontroller can send a wake notification to the processor (step 760), and the processor can unlock the device (step 762) if the touch is a tap. If the touch is not a tap, the device can remain locked (step 772).

Although FIG. 7 illustrates an exemplary process for unlocking a device by detecting a presence of a tap, examples of the disclosure can include detecting a presence of a double tap, detecting a presence of a finger hold, and detecting a presence of a tap followed by a finger hold. Detecting a presence of a double tap or a presence of a finger hold can include comparing the results from the frame history (step 756). Determining if the touch is a double tap can include at least four frames. The four frames can include a finger touch detected in one frame and no finger touch detected in a following frame, followed by a finger touch detected a second time and no finger touch detected a second time. Determining the touch is a finger hold can include multiple frames where the finger touch is detected. In some examples, the number of frames can be higher and/or can be based on a sampling rate. In some examples, determining a presence of a tap can include determining whether the touch is located within a certain region. In some examples, the finger touch detected can be in substantially the same location. In some examples, the finger touch detected can have substantially the same area. In some examples, the frames can be consecutive. Detecting a presence of a tap followed by a finger hold can include at least four frames. The four frames can include a finger touch detected in one frame and no finger touch detected in a following frame followed by a finger touch detected a second time for multiple frames.

Figure 8A:
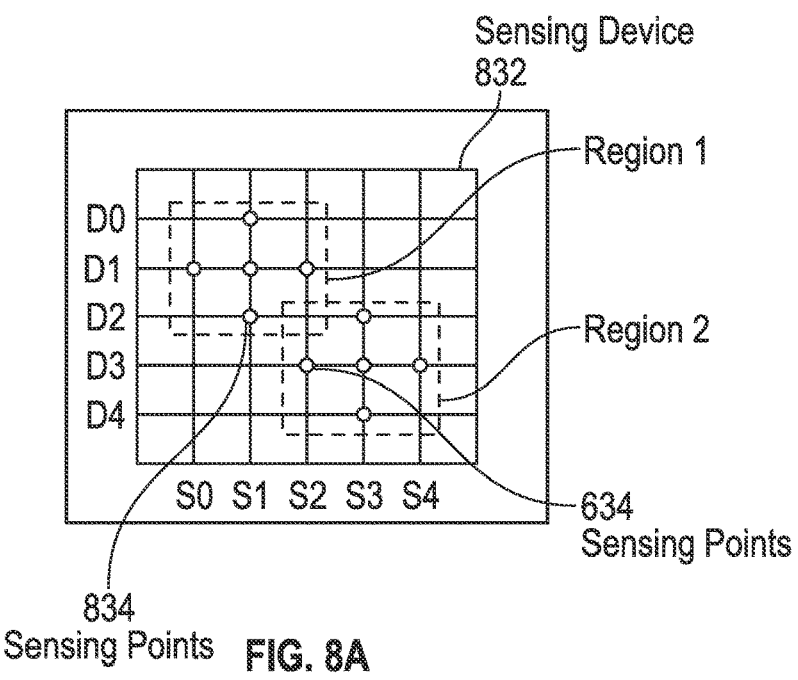
FIGS. 8A-8B illustrate an exemplary process for unlocking a device by detecting a presence of a two or multiple fingers tap according to examples of the disclosure.
Figure 8B:
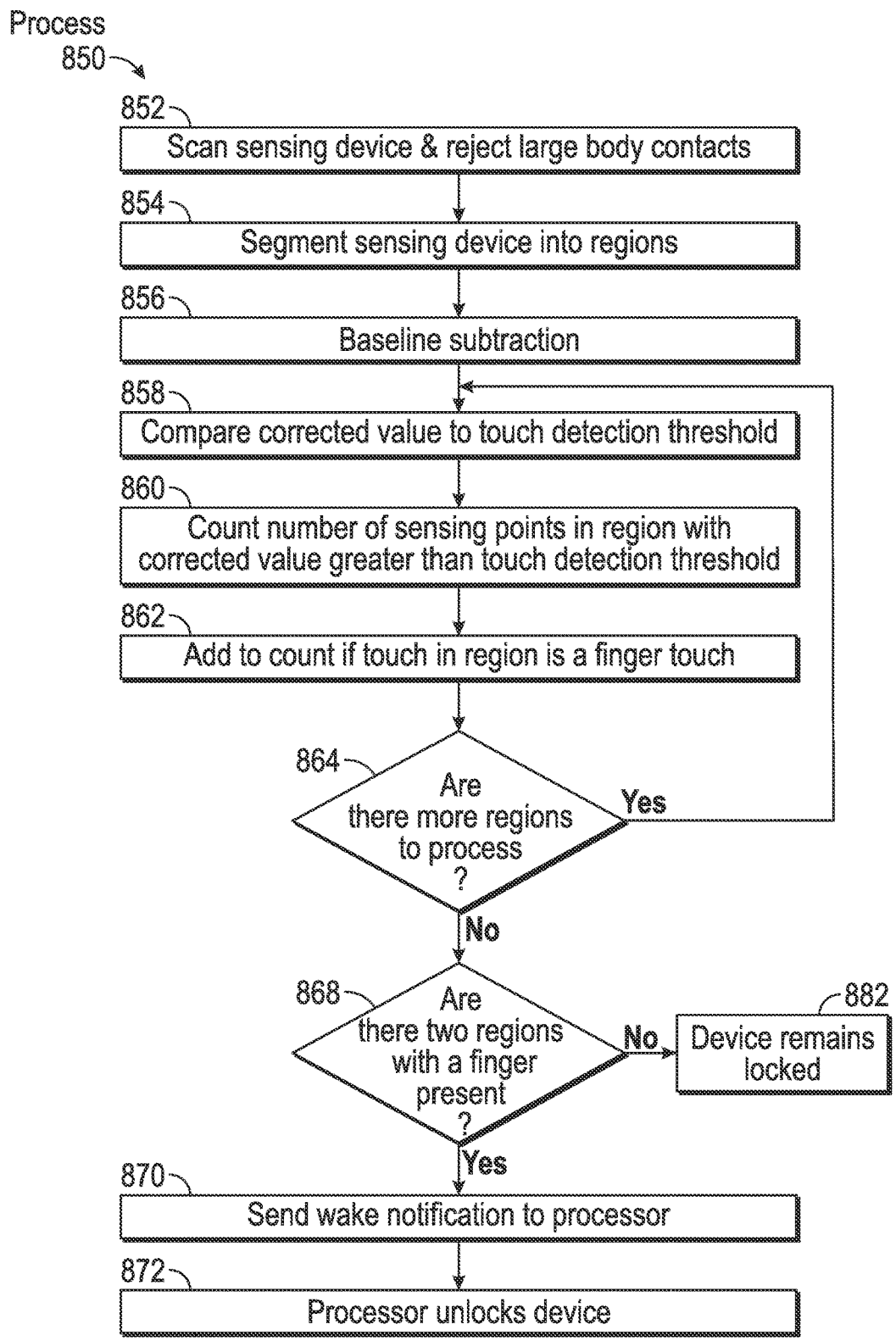

FIGS. 8A-8B illustrate an exemplary process for unlocking a device by detecting a presence of a two or multiple fingers tap according to examples of the disclosure. Detecting a presence of a two fingers tap can include the microcontroller scanning the sensing device 832 and rejecting any touches that are large body contacts in step 852 of process 850. Sensing device 832 can be segmented into regions such as region 1 and region 2 (step 854). Sensing device 832 can determine for each region if a touch in that region is a finger. Determining if a touch in a region is a finger can include, for each sensing point 834, a baseline subtraction (step 856) to result in a plurality of corrected values, comparing each corrected value to a touch detection threshold (step 858), counting the number of sensing points 834 in a region (e.g., region 1 or region 2) with a corrected value greater than the touch detection threshold (step 860), and determining if a touch in the region is a finger touch (step 862). The process can be repeated for each region (step 864). In step 868, the microcontroller can determine if the number of regions with a finger tap is equal to two. If a two fingers tap is present, the microcontroller can send a wake notification to the processor (step 870), and the processor can unlock the device (step 872). Otherwise, the device can remain locked (step 882).

Figure 8C:
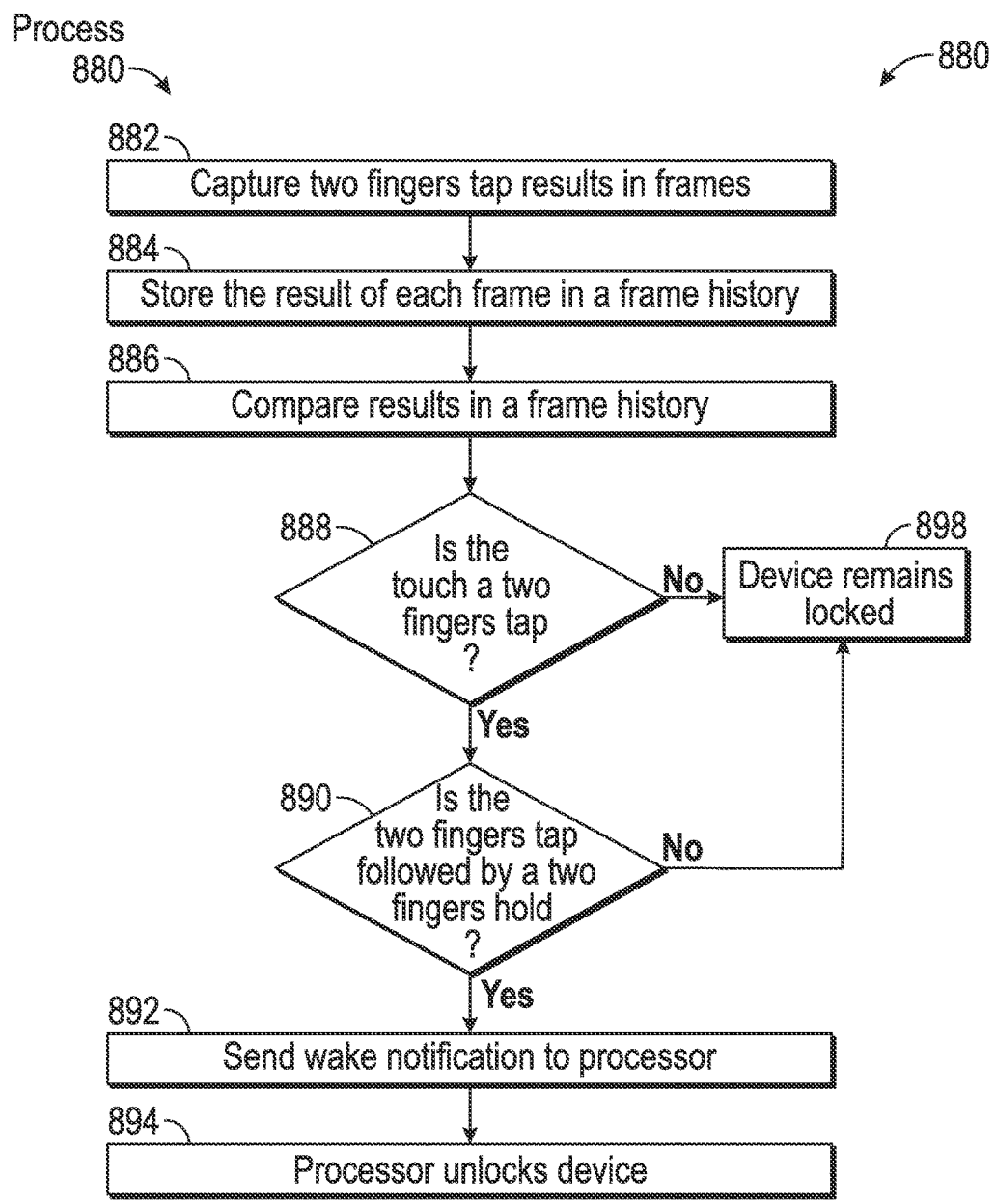
FIG. 8C illustrates an exemplary process for unlocking a device by detecting a presence of a two fingers tap and hold using a lower power scan according to examples of the disclosure.

FIG. 8C illustrates an exemplary process for unlocking a device by detecting a presence of a two fingers tap and hold using a lower power scan according to examples of the disclosure. Process 880 can include capturing two fingers tap results in frames in step 882, and storing the result of each frame in a frame history in step 884. In step 886, the microcontroller can compare the results from the frame history. Based on the results from the frame history, the microcontroller can determine if the touch is a two fingers tap (step 888). In some examples, determining if the touch is a two fingers tap can include a two fingers touch detected in one frame and no finger (or less than or greater than two fingers) touch detected in a following frame. In step 890, microcontroller can determine if a two fingers hold is detected following detection of a two fingers tap. Detection of a two fingers hold can include multiple frames where a touch using two fingers is detected. If a two fingers tap or two fingers hold is not detected, the device can remain locked (step 898). Otherwise, the microcontroller can send a wake notification to the device (step 892), and the processor can unlock the device (step 894).

Figure 9:
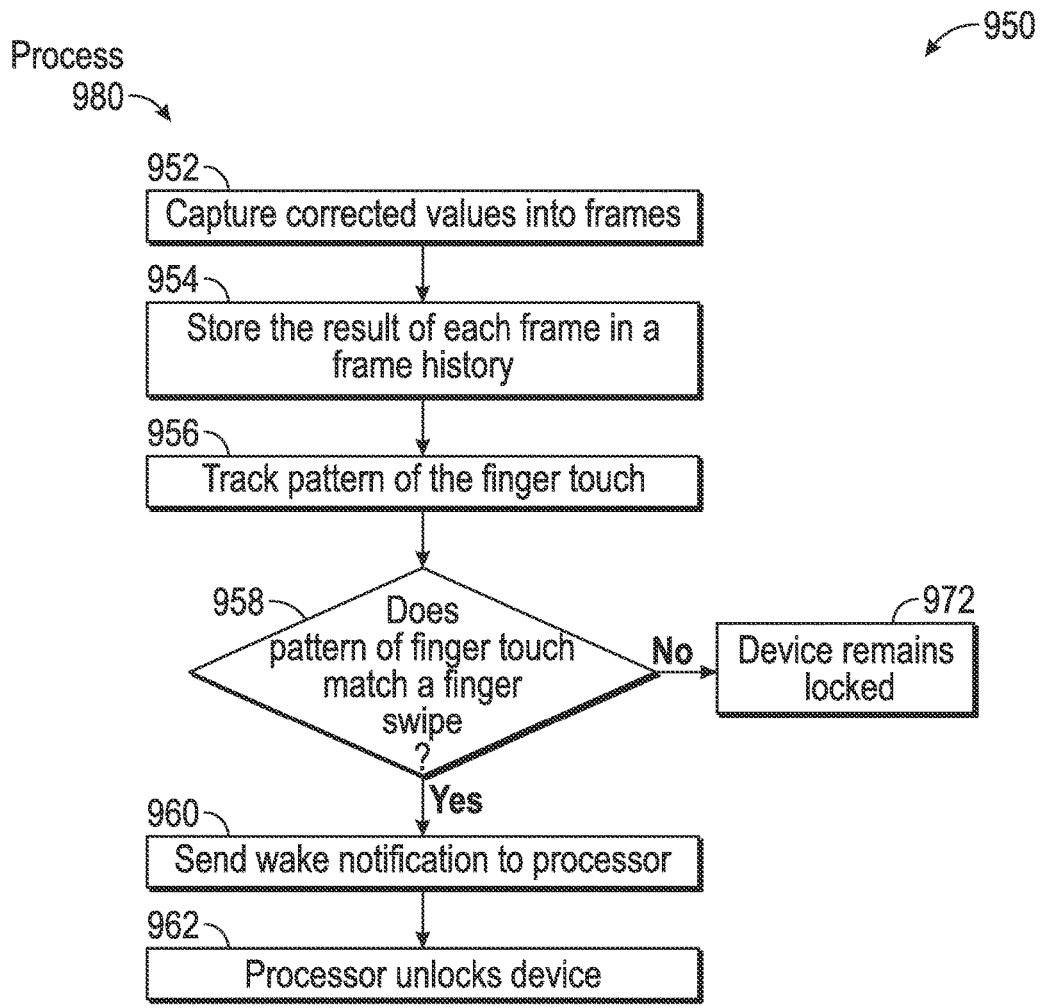
FIG. 9 illustrates an exemplary process for unlocking a device by detecting a presence of a finger swipe according to examples of the disclosure.

FIG. 9 illustrates an exemplary process for unlocking a device by detecting a presence of a finger swipe according to examples of the disclosure. Process 950 can include the microcontroller rejecting any touches that are large body contacts (as illustrated in FIGS. 5A-5E) and determining if the touch is a finger (as illustrated in FIGS. 6A-6F). In step 952, corrected values for the plurality of sensing points can be captured into frames. In step 954, the result of each frame can be stored in a frame history. In step 956, the microcontroller can track the pattern of the finger touch. If the pattern of the finger touch over the course of several frames is similar or closely matches a finger swipe, the microcontroller can determine that a finger swipe is present (step 958). In some examples, determination of a finger swipe can include determining whether a line path is followed over a predetermined number of frames, determining whether a predetermined speed threshold has been exceeded, and/or determining whether the pattern of finger touch is located within a certain region or follows a certain direction. In some examples, an active region centroid location can be determined. In some examples, an active region size metric and/or active region orientation metric can be used. In some examples, frame-to-frame region correlation metric and/or frame-to-frame region velocity region can be used. In some examples, the microcontroller can limit the detection of the finger swipe to one or more designated regions on the touch screen surface. If a finger swipe is present, the microcontroller can send a wake notification to the processor (step 960), and the processor can unlock the device (step 962). If a finger swipe is not present and/or if the location of the finger swipe is not in the designated areas, the device can remain locked (step 972).

In some examples, the one or more examples described above can be sampled at a lower rate than compared to an active touch mode scan rate. In some examples, to prevent false detection, the touch, finger, tap, and/or swipe detection can be limited to a center of the touch screen. The portable electronic device can include a housing surrounding the touch screen. The housing can be made of a conductive material that can couple to the peripheral area of the touch screen. Touches detected in the peripheral area of the touch screen may be from the coupled housing, and as a result, may be a false detection.

Figure 10:
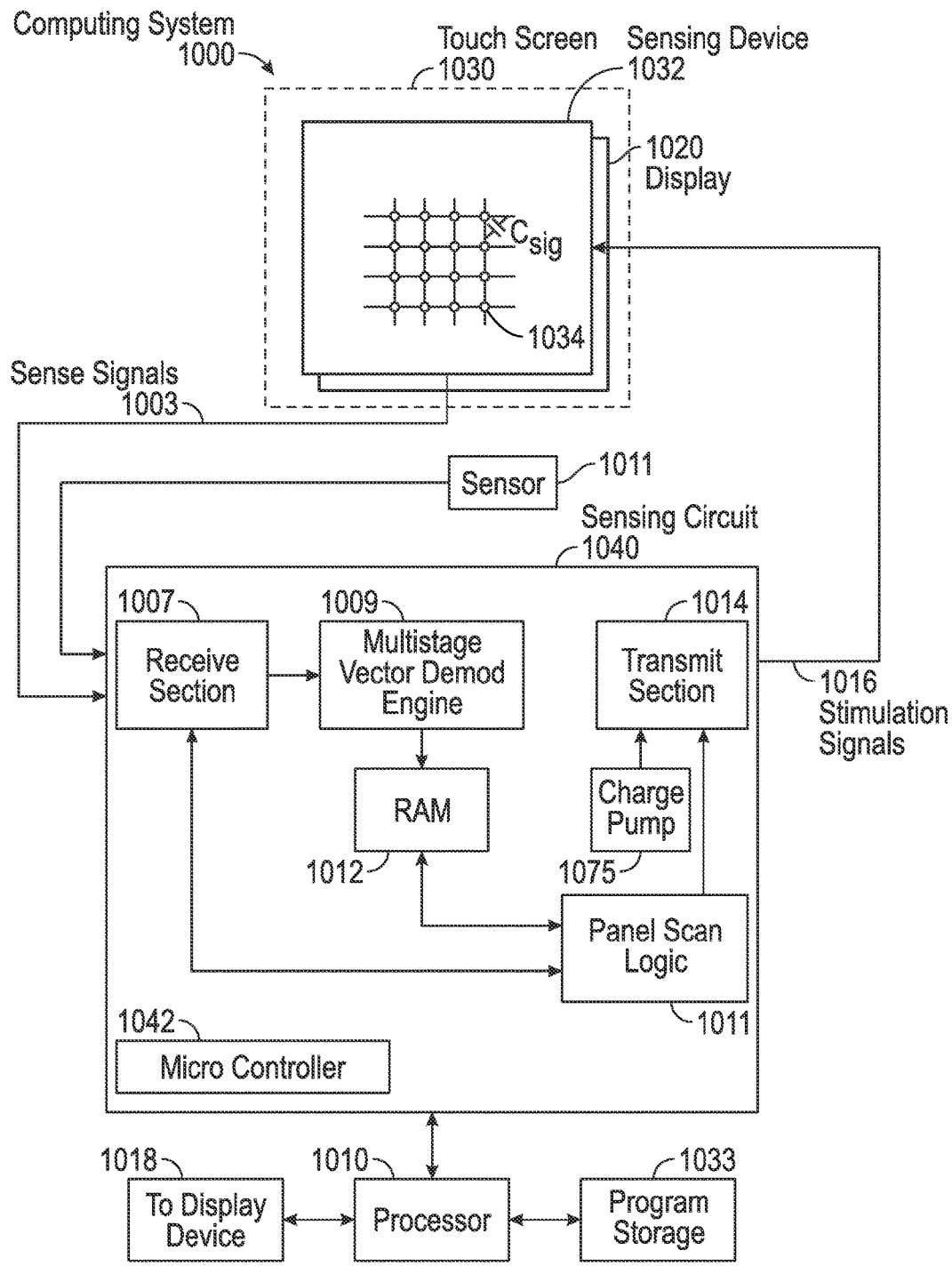
FIG. 10 illustrates an exemplary computing system that can utilize sensing device according to various examples of the disclosure.

FIG. 10 illustrates an exemplary computing system 1000 that can utilize sensing device 1032 according to various examples of the disclosure. Sensing circuit 1040 can be a single application specific integrated circuit (ASIC) that can include one or more microcontrollers 1042, which can include, for example, one or more main processors, such as ARM968 processors, ARM CortexM3 processors, or other processors with similar functionality and capabilities. However, in other examples, some of the processor functionality can be implemented instead by dedicated logic, such as a state machine. Microcontroller 1042 can also include, for example, peripherals such as random access memory (RAM) 1012 or other types of memory or storage, watchdog timers (not shown), and the like. Sensing circuit 1040 can also include, for example, receive section 1007 for receiving signals, such as touch sense signals 1003, from the sense lines of the sensing device 1032 and other signals from other sensors such as sensor 1011, etc. Sensing circuit 1040 can also include, for example, a demodulation section such as multistage vector demod engine 1009, panel scan logic 1011, and a drive system including, for example, transmit section 1014. Panel scan logic 1012 can access RAM 1012, autonomously read data from sense channels, and provide control for the sense channels. In addition, panel scan logic 1011 can control transmit section 1014 to generate stimulation signals 1016 at various frequencies and phases that can be selectively applied to the drive lines of the sensing device 1032.

Charge pump 1015 can be used to generate the supply voltage for the transmit section. Stimulation signals 1016 (Vstim) can have amplitudes higher than the maximum voltage the ASIC process can tolerate by cascading transistors. Therefore, using charge pump 1015, the stimulus voltage can be higher (e.g., 6V) than the voltage level a single transistor can handle (e.g., 3.6 V). Although FIG. 10 shows charge pump 1015 separate from transmit section 1014, the charge pump can be part of the transmit section.

Sensing device 1032 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces or other geometric configurations having first and second dimensions (e.g., the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as pixel, node, or sensing point 1034, which can be particularly useful when sensing device 1032 is viewed as capturing an "image" of touch. (In other words, after sensing circuit 1040 has determined whether a touch event has been detected at each sensing point 1034 in the sensing device 1032, the pattern of sensing points 1034 in the multi-touch panel at which a touch event occurred can be viewed as an "image" of touch (e.g. a pattern of fingers touching the panel.) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Although sensing device 1032 is illustrated as a mutual capacitive touch sensing device, examples of the disclosure can include a self-capacitive touch sensing device. For a self-capacitive touch sensing device, sensing device 1032 can have a plurality of touch pixel electrodes with an inherent self-capacitance to ground associated with it, and also an additional self-capacitance to ground that can be formed when an object is in proximity to or touching one or more touch pixel electrodes. The one or more touch pixel electrodes can be coupled to a sensing circuit. Sensing circuit can include an operational amplifier, a feedback resistor, a feedback capacitor and an input voltage source, although other configurations can be employed. For example, the feedback resistor can be replaced by a switch capacitor resistor. The touch pixel electrodes can be coupled to an inverting input of an operational amplifier. An AC voltage source can be coupled to the non-inverting input of the operational amplifier. The sensing circuit can be configured to sense changes in the total self-capacitance of a touch pixel electrode induced by the object touching (or in proximity to) the touch sensor panel. The output can be used by a processor to determine a presence of a proximity or touch event, or the output can be inputted into a discreet logic network to determine the presence of a touch or proximity event.

Computing system 1000 can also include processor 1010 for receiving outputs from microcontroller 1042 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Processor 1010 can perform additional functions that may not be related to panel processing, and can be coupled to program storage 1033 and display 1020, such as an LCD display, for providing a user interface to a user of the device. In some examples, processor 1010 can be a separate component for sensing circuit 1040, as shown. In other examples, processor 1010 can be included as part of sensing circuit 1040. In other examples, the functions of processor 1010 can be performed by microcontroller 1042 and/or distributed among other components of sensing circuit 1040. Display device 1020 together with sensing device 1032, when located partially or entirely under the sensing device 1032, can form touch screen 1030.

Note that one or more of the functions described above can be performed, for example, by firmware stored in memory (e.g. one of the peripherals) and executed by processor subsystem 1002, or stored in program storage 1032 and executed by processor 1010. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

Some of the examples of the disclosure are directed to a method for switching a device from an idle state to an active state. The method may comprise: determining if a touch on a touch surface of the device is at least one of an object presence, tap, hold and swipe; and when the touch is at least one of the object presence, tap, hold and swipe, generating a wake notification. Additionally or alternatively to one or more examples disclosed above, in other examples, determining if the touch on the touch surface of the device is at least one of the object presence, tap, hold and swipe comprises: determining if the touch is a large body contact; and discarding touch values corresponding to the touch when the touch is a large body contact. Additionally or alternatively to one or more examples disclosed above, in other examples, determining if the touch is a large body contact comprises: determining a plurality of touch values corresponding to the touch; summing a first number of first touch values, the first touch values being a subset of the plurality of touch values; summing a second number of second touch values, the second touch values being a subset of the plurality of touch values; determining if the summation of the first number of first touch values is greater than or equal to a first threshold value; and determining if the summation of the second number of second touch values is greater than or equal to a second threshold value. Additionally or alternatively to one or more examples disclosed above, in other examples, determining if the touch on the touch surface of the device is at least one of an object presence, tap, hold and swipe comprises: determining a touch threshold value; determining if the touch is located in a center of the device; and if the touch is determined to be located in the center of the device, determining if a touch value corresponding to the touch is greater than or equal to the touch threshold value. Additionally or alternatively to one or more examples disclosed above, in other examples, determining if the touch on the touch surface of the device is an object presence comprises: determining a touch threshold value; counting a number of touch values corresponding to the touch that is greater than or equal to the touch threshold value; determining a pixel number threshold; comparing the count to the pixel number threshold; and determining if the touch is a small finger, large finger, or flat finger or thumb based on the comparison. Additionally or alternatively to one or more examples disclosed above, in other examples, determining if the touch on the touch surface of the device is an object presence comprises: determining a touch threshold value; summing a plurality of touch values for a number of touch values corresponding to the touch that is greater than or equal to the touch threshold value; determining a density based on the summation; and determining if the density is greater than a density of a finger and less than a density of a palm. Additionally or alternatively to one or more examples disclosed above, in other examples, determining if the touch on the touch surface of the device is a tap comprises: determining a plurality of touch values for a plurality of frames corresponding to the touch; storing the plurality of touch values for each frame in a frame history; determining if the touch is the tap in a first frame; and determining if the touch surface includes no touch in a second frame, the second frame following the first frame. Additionally or alternatively to one or more examples disclosed above, in other examples, the method further comprises: determining if the touch is a tap in a third frame, the third frame following the second frame; and determining if the touch surface includes no touch in a fourth frame, the fourth frame following the third frame. Additionally or alternatively to one or more examples disclosed above, in other examples, determining if the touch on the touch surface of the device is a hold comprises: determining a plurality of touch values for a plurality of frames corresponding to the touch; storing the plurality of touch values for each frame in a frame history; determining if the touch is a tap in a first frame; and determining if the touch in a second frame is same as the first frame. Additionally or alternatively to one or more examples disclosed above, in other examples, the method further comprises segmenting the touch surface into multiple regions, wherein the determination is based on at least one of an object presence, tap, hold and swipe for each region. Additionally or alternatively to one or more examples disclosed above, in other examples, determining if the touch on the touch surface of the device is a swipe comprises: determining a plurality of touch values corresponding to the touch; determining a touch pattern of the plurality of touch values; and determining if the touch pattern corresponds to a swipe pattern. Additionally or alternatively to one or more examples disclosed above, in other examples, the method further comprises powering on a processor in response to the wake notification. Additionally or alternatively to one or more examples disclosed above, in other examples, the method further comprises: determining if the touch is located in or near a center of a screen of the device, and generating the wake notification if the touch is determined to be located in or near the center.

Some examples of the disclosure are directed to a device configured to switch from an idle state to an active state, the device comprising: logic configured to determine if a touch on a touch surface of the device is at least one of an object presence, tap, hold and swipe, wherein the logic is further configured to generate a wake notification when the touch is at least one of the object presence, tap, hold and swipe. Additionally or alternatively to one or more examples disclosed above, in other examples, the logic is further configured to determine if the touch is a large body contact, and discarding touch values corresponding to the touch when the touch is a large body contact. Additionally or alternatively to one or more examples disclosed above, in other examples, the logic is further configured to segment the touch surface into multiple regions, wherein the determination is based on at least one of an object presence, tap, hold and swipe for each region. Additionally or alternatively to one or more examples disclosed above, in other examples, the logic is further configured to power on a processor in response to the wake notification. Additionally or alternatively to one or more examples disclosed above, in other examples, the logic further comprises determining if the touch is located in or near a center of a screen of the device, and generating the wake notification if the touch is determined to be located in or near the center.

Some examples of the disclosure are directed to a non-transitory computer-readable storage medium storing instructions which, when executed by a computing device, causes the computing device to process user input, the instructions comprising: determining if a touch on a touch surface of the device is at least one of an object presence, tap, hold and swipe; and when the touch is at least one of an object presence, tap, hold and swipe, generating a wake notification. Additionally or alternatively to one or more examples disclosed above, in other examples, the instructions further comprises powering on a processor in response to the wake notification.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method for switching a device from an idle state to an active state, the device including a touch panel, a microcontroller, and a processor, the method comprising:
   in the idle state:
   powering on the microcontroller;
   determining if a first set of changes in capacitance associated with one or more sensing nodes, included in a plurality of sensing nodes, match a first pre-determined criteria over a sequence of measurements using the microcontroller;
   determining if the first set of changes in capacitance match a second pre-determined criteria over the sequence of measurements using the microcontroller; and
   after determining if the first set of changes in capacitance match the first pre-determined criteria over the sequence of measurements and determining if the first set of changes in capacitance match the second pre-determined criteria over the sequence of measurements:
   in accordance with a determination that the first set of changes in capacitance match both the first pre-determined criteria over the sequence of measurements and the second pre-determined criteria over the sequence of measurements, discarding the first set of changes in capacitance;
   in accordance with a determination that the first set of changes in capacitance match the first pre-determined criteria over the sequence of measurements and do not match the second pre-determined criteria over the sequence of measurements, generating and transmitting a signal from the microcontroller to the processor;
   in accordance with a determination that the first set of changes in capacitance do not match the first pre-determined criteria, discarding the first set of changes in capacitance;
   wherein:
   the processor is a hardware component separate from the microcontroller,
   the first pre-determined criteria are between first and second threshold values, the first and second threshold values being different from each other, and
   the second pre-determined criteria are between third and fourth threshold values, the third and fourth threshold values being different from each other and different from the first and second threshold values.

2. The method of claim 1, further comprising:
determining a plurality of touch values corresponding to the first set of changes in capacitance;
summing a first number of first touch values, the first touch values being a subset of the plurality of touch values;
determining if the summation of the first number of first touch values is greater than a fifth threshold value;
summing a second number of second touch values, the second touch values being a subset of the plurality of touch values;
determining if the summation of the second number of second touch values is greater than a sixth threshold value; and
discarding the plurality of touch values and maintaining the device in the idle state when the summation of the first number of first touch values is greater than the fifth threshold value and the summation of the second number of second touch values is greater than the sixth threshold value.

3. The method of claim 1, further comprising:
determining a fifth threshold value;
determining if the first set of changes in capacitance are associated with one or more touch nodes located in a center of the device; and
when the first set of changes in capacitance are associated with one or more touch nodes located in the center of the device, determining if a sum of touch values corresponding to the first set of changes in capacitance is greater than or equal to the fifth threshold value.

4. The method of claim 1, further comprising:
determining a fifth threshold value;
counting a number of a plurality of touch values associated with the first set of changes in capacitance that is greater than or equal to the fifth threshold value;
determining if the counted number is less than 20% of a number of the plurality of sensing nodes included in the device.

5. The method of claim 4, further comprising:
summing the plurality of touch values;

determining a density based on the summation; and
determining if the density is greater than a density of a finger and less than a density of a palm.

6. The method of claim 1, further comprising:
determining a plurality of touch values for a plurality of frames, the plurality of frames including a first frame, a second frame, a third frame, and a fourth frame;
storing the plurality of touch values for each frame;
determining if the first set of changes in capacitance is in the first frame; and
determining a first absence of a change in capacitance in the second frame, the second frame following the first frame.

7. The method of claim 6, further comprising:
determining if a second set of changes in capacitance matches the first pre-determined criteria in the third frame, the third frame following the second frame; and
determining a second absence of change in capacitance in the fourth frame, the fourth frame following the third frame.

8. The method of claim 1, further comprising:
determining the plurality of touch values for a plurality of frames, the plurality of frames including a first frame and a second frame;
storing the plurality of touch values for each frame;
determining if the first set of changes in capacitance are in the first frame; and
determining if a second set of changes in capacitance in the second frame are same as the first set of changes of capacitance in the first frame, the second frame following the first frame.

9. The method of claim 1, further comprising:
segmenting the plurality of sensing nodes into multiple regions, wherein the determination of whether the first set of changes in capacitance match the first pre-determined criteria is performed in each region.

10. The method of claim 9, further comprising:
counting a number of regions associated with the determined match, wherein generating and transmitting the signal to the processor is based on the count.

11. The method of claim 1, further comprising:
determining a plurality sets of changes of capacitance for a plurality of frames;
determining a touch pattern from the plurality of frames; and
determining if the touch pattern matches a line.

12. The method of claim 1, further comprising powering on the processor in response to the signal, wherein the processor is off in the idle state.

13. The method of claim 1, further comprising:
activating a subset of the plurality of sensing nodes, the subset located in a center of the device; and
deactivating all other sensing nodes included in the plurality of sensing nodes.

14. The method of claim 1, wherein the first pre-determined criteria are touch area criteria.

15. The method of claim 14, wherein:
the first threshold value corresponds to a first number of sensing nodes having a change in capacitance above a touch detection threshold, and
the second threshold value corresponds to a second number of sensing nodes having a change in capacitance above the touch detection threshold.

16. The method of claim 1, wherein determining if the first set of changes in capacitance match the second pre-determined criteria comprises determining whether a predetermined number of touch nodes have a corresponding change in capacitance between the third threshold and the second threshold.

17. A device configured to switch from an idle state to an active state, the device comprising:
a touch panel;
a processor configured to sense a touch during the active state; and
a microcontroller configured to:
power on in the idle state,
sense a touch during the idle state by determining if a first set of changes in capacitance associated with one or more sensing nodes, included in a plurality of sensing nodes, match a first pre-determined criteria over a sequence of measurements,
determine if the first set of changes in capacitance match a second pre-determined criteria over the sequence of measurements, and
after determining if the first set of changes in capacitance match the first pre-determined criteria over the sequence of measurements and determining if the first set of changes in capacitance match the second pre-determined criteria over the sequence of measurements:
in accordance with a determination that the first set of changes in capacitance match both the first pre-determined criteria over the sequence of measurements and the second pre-determined criteria over the sequence of measurements, discard the first set of changes in capacitance;
in accordance with a determination that the first set of changes in capacitance match the first pre-determined criteria over the sequence of measurements and do not match the second pre-determined criteria over the sequence of measurements, generate and transmit a signal from the microcontroller to the processor;
in accordance with a determination that the first set of changes in capacitance do not match the first pre-determined criteria, discard the first set of changes in capacitance;
wherein:
the processor is a hardware component separate from the microcontroller, the first pre-determined criteria are between first and second threshold values, the first and second threshold values being different from each other, and
the second pre-determined criteria are between third and fourth threshold values, the third and fourth threshold values being different from each other and different from the first and second threshold values.

18. The device of claim 17, wherein the plurality of sensing nodes is segmented into multiple regions, each region having a center different from other regions.

19. The device of claim 17, wherein the processor is further configured to power on in response to the signal.

20. The device of claim 17, wherein the microcontroller is an application specific integrated circuit (ASIC).

21. The device of claim 17, further comprising:
a first plurality of sensing nodes configured to be activated during the idle state and the active state and located in a center region of the device; and
a second plurality of sensing nodes configured to be activated during the active state and deactivated during the idle state and located in a border area of the device.

22. The device of claim 17, wherein the first pre-determined criteria are touch area criteria.

23. The device of claim 22, wherein:
the first threshold value corresponds to a first number of sensing nodes having a change in capacitance above a touch detection threshold, and
the second threshold value corresponds to a second number of sensing nodes having a change in capacitance above the touch detection threshold.

24. The device of claim 17, wherein determining if the first set of changes in capacitance match the second pre-determined criteria comprises determining whether a predetermined number of touch nodes have a corresponding change in capacitance between the third threshold and the second threshold.

25. A non-transitory computer-readable storage medium storing instructions which, when executed by a computing device causes the computing device to process user input, wherein the computing device includes a touch panel, a microcontroller, and a processor, the instructions comprising:
in the idle state:
powering on the microcontroller;
determining if a first set of changes in capacitance associated with one or more sensing nodes, included in a plurality of sensing nodes, match a first pre-determined criteria over a sequence of measurements using the microcontroller;
determining if the first set of changes in capacitance match a second pre-determined criteria over the sequence of measurements using the microcontroller; and
after determining if the first set of changes in capacitance match the first pre-determined criteria over the sequence of measurements and determining if the first set of changes in capacitance match the second pre-determined criteria over the sequence of measurements:
in accordance with a determination that the first set of changes in capacitance match both the first pre-determined criteria over the sequence of measurements and the second pre-determined criteria over the sequence of measurements, discarding the first set of changes in capacitance;
in accordance with a determination that the first set of changes in capacitance match the first pre-determined criteria over the sequence of measurements and do not match the second pre-determined criteria over the sequence of measurements, generating and transmitting a signal from the microcontroller to the processor;
in accordance with a determination that the first set of changes in capacitance do not match the first pre-determined criteria, discarding the first set of changes in capacitance;
wherein:
the processor is a hardware component separate from the microcontroller,
the first pre-determined criteria are between first and second threshold values, the first and second threshold values being different from each other, and
the second pre-determined criteria are between third and fourth threshold values, the third and fourth threshold values being different from each other and different from the first and second threshold values.

26. The non-transitory computer-readable storage medium of claim 19, the instructions further comprising:
powering on the processor in response to the signal.

27. The non-transitory computer-readable storage medium of claim 25, wherein the first pre-determined criteria are touch area criteria.

28. The non-transitory computer-readable storage medium of claim 27, wherein:
the first threshold value corresponds to a first number of sensing nodes having a change in capacitance above a touch detection threshold, and
the second threshold value corresponds to a second number of sensing nodes having a change in capacitance above the touch detection threshold.

29. The non-transitory computer-readable storage medium of claim 25, wherein determining if the first set of changes in capacitance match the second pre-determined criteria comprises determining whether a predetermined number of touch nodes have a corresponding change in capacitance between the third threshold and the second threshold.

* * * * *

UNITED STATES PATENT AND TRADEMARK OFFICE
CERTIFICATE OF CORRECTION

PATENT NO.       : 10,095,345 B2
APPLICATION NO.  : 14/292736
DATED            : October 9, 2018
INVENTOR(S)      : Louis W. Bokma et al.

Page 1 of 1

It is certified that error appears in the above-identified patent and that said Letters Patent is hereby corrected as shown below:

In the Claims

At Column 22, Claim number 26, Line number 22, please delete "claim 19" and replace with --claim 25--.

Signed and Sealed this
Fifth Day of February, 2019

Andrei Iancu
*Director of the United States Patent and Trademark Office*